(12) United States Patent
Rix

(10) Patent No.: US 6,650,254 B1
(45) Date of Patent: Nov. 18, 2003

(54) COMPUTER INPUT DEVICE WITH INDIVIDUALLY POSITIONABLE AND PROGRAMMABLE SWITCHES

(75) Inventor: Scott M. Rix, Arlington, VA (US)

(73) Assignee: Ergodex, Mountain View, CA (US)

( * ) Notice: Subject to any disclaimer, the term of this patent is extended or adjusted under 35 U.S.C. 154(b) by 0 days.

(21) Appl. No.: 09/524,011

(22) Filed: Mar. 13, 2000

(51) Int. Cl.[7] .............................................. H03M 11/00
(52) U.S. Cl. .......................... 341/22; 341/20; 341/26; 345/168; 400/486; 400/492
(58) Field of Search ............................. 341/20, 22, 26; 345/172, 168; 400/486, 492, 489

(56) References Cited

U.S. PATENT DOCUMENTS

| | | | |
|---|---|---|---|
| 3,623,016 A | 11/1971 | Winkler | 341/50 |
| 4,602,138 A | 7/1986 | Berutto et al. | 700/534 |
| 4,779,079 A | 10/1988 | Hauck | 345/168 |
| 4,906,117 A | 3/1990 | Birdwell | 400/490 |
| 4,964,075 A * | 10/1990 | Shaver et al. | 235/146 |
| 5,144,302 A | 9/1992 | Carter et al. | 341/20 |
| 5,189,543 A * | 2/1993 | Lin et al. | 359/142 |
| 5,247,285 A * | 9/1993 | Yokota et al. | 248/919 |
| 5,259,626 A | 11/1993 | Ho | 463/37 |
| 5,396,267 A | 3/1995 | Bouton | 345/168 |
| 5,410,333 A | 4/1995 | Conway | 345/169 |
| 5,438,331 A | 8/1995 | Gilligan et al. | 341/35 |
| 5,539,775 A | 7/1996 | Tuttle et al. | |
| 5,572,226 A | 11/1996 | Tuttle | |
| 5,579,002 A | 11/1996 | Iggulden et al. | 341/23 |
| 5,621,316 A | 4/1997 | Dames et al. | 324/207.13 |
| 5,734,376 A | 3/1998 | Hsien | 315/168 |
| 5,743,666 A | 4/1998 | VanZeeland et al. | 400/485 |
| 5,838,307 A | 11/1998 | Bouton | 345/168 |
| 5,842,118 A | 11/1998 | Wood, Jr. | |
| 5,854,945 A | 12/1998 | Criscito et al. | 710/62 |
| 5,870,033 A | 2/1999 | Strolo | |
| 5,896,125 A | 4/1999 | Niedzwiecki | 345/168 |
| 5,920,308 A | 7/1999 | Kim | |

(List continued on next page.)

OTHER PUBLICATIONS

IBM TDB Jun. 1990, "Customizable Keys Using Add–On 'Plugs'".*
IBM Technical Disclosure Bulletin, Boardless Terminal Keyboard, vol. 32, 10A, Mar. 1990, pp. 82–84.
Microchip, microID 13.56 MHz RFID, System Design Guide, 2001, entire document.

(List continued on next page.)

Primary Examiner—Michael Horaoik
Assistant Examiner—Albert K. Wong
(74) Attorney, Agent, or Firm—Swidler Berlin Shereff Friedman, LLP

(57) ABSTRACT

A configurable computer input device. At least one switch is removably attachable to a surface and is in communication with a processor. At least one function is assignable to activation of the switch. The at least one switch may be repositioned distances smaller than a length or width of the at least one switch. Circuitry is in communication with the at least one switch for assigning at least one function to activation of the switch. Circuitry communicates the at least one function to a host computer. Circuitry determines the actuation status of the at least one switch and communicates the actuation status to the host computer.

8 Claims, 24 Drawing Sheets

U.S. PATENT DOCUMENTS

| | | | |
|---|---|---|---|
| 5,929,760 | A | 7/1999 | Monahan |
| 5,949,335 | A | 9/1999 | Maynard |
| 5,986,586 | A * | 11/1999 | Tsai .......................... 341/22 |
| 5,995,048 | A | 11/1999 | Smithgall et al. |
| 6,018,335 | A * | 1/2000 | Onley et al. ................. 341/22 |
| 6,069,564 | A | 5/2000 | Hatano et al. |
| 6,097,301 | A | 8/2000 | Tuttle |
| 6,097,347 | A | 8/2000 | Duan et al. |
| 6,133,833 | A | 10/2000 | Sidlauskas et al. |
| 6,163,282 | A * | 12/2000 | Mitsuzuka et al. ......... 200/533 |
| 6,166,706 | A | 12/2000 | Gallagher, III et al. |
| 6,172,609 | B1 | 1/2001 | Lu et al. |
| 6,184,841 | B1 | 2/2001 | Shober et al. |
| 6,236,315 | B1 | 5/2001 | Helms et al. |
| 6,278,369 | B2 | 8/2001 | Smith et al. |
| 6,285,295 | B1 | 9/2001 | Casden |
| 6,285,342 | B1 | 9/2001 | Brady et al. |
| 6,331,145 | B1 | 12/2001 | Sity et al. |
| 6,340,116 | B1 | 1/2002 | Cecil et al. |
| 6,351,215 | B2 | 2/2002 | Rodgers et al. |
| 6,381,418 | B1 | 4/2002 | Spurr et al. |

OTHER PUBLICATIONS

ISO/IEC Final Committee Draft 15693–1, pp. 2–??.

"Extrasensory Computing", PC Magazine, Apr. 20, 1999, p. 30.

Moyer et al., Silicon Graphics, Inc., Dial and Button Box Installation Guide, Document No. 007–9008–060, 30 pages, copyright 1997 and Product Data Sheet.

Product review of Saitek PC Dash, Saitek Industries Limited, review date Nov. 22, 1997.

* cited by examiner

Fig. 7

| R 2D R:3 C:7 | PAD * 7C R:6 C:15 | M 3A R:6 C:6 | U 3C R:3 C:6 | I 43 R:3 C:5 | F3 04 R:4 C:8 | CAPS 58 R:4 C:10 | ; 4C R:0 C:3 | - 4E R:1 C:3 | 9 46 R:2 C:4 |
|---|---|---|---|---|---|---|---|---|---|
| Y 35 R:3 C:6 | X 22 R:6 C:10 | PAD 5 73 R:4 C:12 | PAD 4 6B R:4 C:9 | PAD 3 7A R:0 C:15 | PAD 2 72 R:0 C:12 | F10 09 R:2 C:2 | F1 05 R:1 C:10 | F 2B R:0 C:7 | ESC 76 R:5 C:11 |
| W 1D R:3 C:10 | V 2A R:6 C:7 | PAD 1 69 R:0 C:9 | PAD 0 70 R:5 C:12 | PAD + 79 R:3 C:16 | PAD . 71 R:5 C:15 | RET 5A R:6 C:2 | E 24 R:3 C:8 | D 23 R:0 C:8 | Z 1A R:6 C:11 |
| Tab 0D R:4 C:11 | T 2C R:4 C:7 | PAD - 7B R:7 C:15 | P 4D R:3 C:3 | O 44 R:3 C:4 | N 31 R:7 C:6 | BACK 66 R:4 C:2 | B 32 R:7 C:8 | A 1C R:0 C:11 | = 55 R:1 C:5 |
| SPA 29 R:7 C:2 | SCR 7E R:3 C:1 | L CTR 14 R:1 C:17 | L ALT 11 R:5 C:1 | L 4B R:0 C:4 | K 42 R:0 C:5 | ~ 0E R:1 C:11 | J 5B R:4 C:5 | L 54 R:4 C:3 | / 4A R:7 C:3 |
| S 1B R:0 C:10 | Q 15 R:3 C:11 | J 3B R:0 C:6 | H 33 R:5 C:6 | G 34 R:5 C:7 | NUM 77 R:6 C:9 | . 49 R:6 C:4 | , 5D R:0 C:2 | . 52 R:5 C:3 | 8 3E R:2 C:5 |
| PAD 9 7D R:3 C:10 | PAD 8 75 R:3 C:12 | F8 0A R:0 C:6 | F7 83 R:5 C:4 | F6 0B R:5 C:5 | F5 03 R:5 C:2 | 7 3D R:2 C:6 | 6 36 R:1 C:6 | 5 2E R:1 C:7 | 4 25 R:2 C:7 |
| PAD 7 6C R:3 C:9 | PAD 6 74 R:4 C:15 | F4 0C R:5 C:8 | F2 06 R:1 C:8 | F12 07 R:2 C:12 | F11 78 R:2 C:9 | 3 26 R:2 C:8 | 2 1E R:2 C:10 | 1 16 R:2 C:11 | 0 45 R:2 C:3 |

112 — (key label)
114 — (hex code)
116 — R: (row)
118 — C: (column)

MEMORY
128K (64K CODE + 64K DATA)

MICROCONTROLLER DEVELOPMENT BOARD

| | | |
|---|---|---|
| P1.0 *OMATRIXO_CLK* | | A15 |
| P1.1 *OCPUO_CLK* | *16 BIT ADDRESS* | A14 |
| P1.2 *SYSTEM_RESET* | *HIGH BYTE* | A13 |
| P1.3 *OKEYO_CLK* | | A12 |
| P1.4 *CPUI_DATA* | | A11 |
| P1.5 *CPUI_CLK* | | A10 |
| P1.6 *RS* | | A9 |
| P1.7 *EN* | | A8 |
| | | |
| P3.0 *MATRIXI_DATA* | | A7 |
| P3.1 *KEYI_DATA* | *16 BIT ADDRESS* | A6 |
| P3.2 *MATRIXI_CLK* | *LOW BYTE* | A5 |
| P3.3 *KEYI_CLK* | *(DE-MUXED)* | A4 |
| P3.4 *OKEYO_DATA* | | A3 |
| P3.5 *OCPUO_DATA* | | A2 |
| P3.6 *WR_L* | | A1 |
| P3.7 *RD_L* | | A0 |

*MULTIPLEXED 16 BIT ADDRESS LOW BYTE AND 8-BIT DATA*

AD7
AD6
AD5
AD4
AD3
AD2
AD1
AD0

*HIGH NYBBLE ADDRESS DECODE  FXXX_L*

Fig. 10

COMPUTER INPUT DEVICE WITH INDIVIDUALLY POSITIONABLE AND PROGRAMMABLE SWITCHES

FIELD OF THE INVENTION

The present invention relates to computer input devices. In particular, the present invention relates to an improved computer input device design that includes individually positionable and programmable switches. Also, the present invention relates to a system that includes the input device and to a method of programming a computer input device.

BACKGROUND OF THE INVENTION

Traditional computer keyboard designs provide skilled typists with an effective instrument for data entry. For even a moderately trained user, the standard keyboard offers an adequate means to produce text or numerical data quickly and efficiently. However, the typical "QWERTY" style keyboard borrows much of its layout from the mechanical typewriters and adding machines that were originally invented at the end of the 19th century.

Practical computer use demands much more than the simple data entry tasks that these legacy layouts were created to perform. Many computer applications, including games, word processors, spread sheets, data bases, graphics programs, and computer aided design (CAD) applications, commonly rely on keyboard input to receive control instructions, initiate macros, or execute specific commands. Current keyboard layouts are not well suited to handle many of these functions easily, comfortably, or efficiently. Increasingly, these antiquated layouts are impelled to accommodate many more modern uses, exposing the inherent limitations of standard keyboard designs.

A good example of the shortcomings of standard computer keyboards is demonstrated by computer games. Many computer game players rely on a traditional computer keyboard as a primary input device. A typical game will assign one or more different keys on the standard keyboard to a corresponding action within the game. As computer games have become more involved and complex, more keys on the keyboard are required to control these virtual actions. This system often leaves game players using inconvenient or awkward key layouts that are not comfortable or effective. Furthermore, the often repetitive nature of key input required by video games amplifies the discomfort and awkward movements experienced from using key layouts not specifically adjusted for the unique hand anatomy of an individual game player.

Another failure of traditional keyboards stems from the inherent inability of the user to reposition individual key switches in a layout that reflects the associated key function. This shortcoming can also appear in video game controllers, particularly with children. Known available input devices, whether keyboards, game controllers, or others, offer very little alternatives to either the functional or physical layout of the input devices.

Programmable function keys are well known in the art. However, in general, once the overall location of keys is determined by a keyboard manufacturer, the user cannot easily change or modify the physical layout of a keyboard or game controller. Typically, the user must adapt to and memorize the locations of the keys in relation to their corresponding functions for each application. Often, the physical location of a key does not, in any way, indicate or allude to its underlying function. For example, a common action in computer graphics programs is to align two or more on-screen shapes. Typically, there is more than one geometrical way to align these shapes, including by their top, middle, bottom, left, center, or right, as well as by combinations of these, such as aligning the shapes by their top-left corners. Although it is possible to use traditional programmable function keys to perform these actions, it is generally not possible to reposition the keys in a way that intuitively reflects their particular function.

SUMMARY OF THE INVENTION

The present invention provides a configurable computer input device. The device includes at least one switch removably attachable to a surface and in communication with a processor. At least one function is assignable to activation of the switch. The at least one switch may be repositioned at distances smaller than a length or width of the at least one switch. The device also includes circuitry in communication with the at least one switch for assigning at least one function to activation of the switch. Circuitry communicates the at least one function to a host computer. The device additionally includes circuitry for determining the actuation status of the at least one switch and communicating the actuation status to the processor.

Also, the present invention concerns a configurable computer input device. The device includes at least one switch removably attachable to a receiving surface. The at least one receiving surface receives the at least one switch at a plurality of positions. A distance separating any two positions may be smaller than a length or a width of the at least one switch. A memory stores data comprising a mapping of at least one electronic, alphanumeric, or keyboard function to the at least one switch when the at least one switch is removably attached to a position of the receiving surface. The device also includes circuitry for scanning the at least one switch when the at least one switch is removably attached to a position of the receiving surface and for determining the actuation status of the at least one switch. A controller is responsive to the circuitry for scanning and for consulting the memory to obtain the at least one function mapped to the at least one switch upon actuation of the at least one switch. Circuitry transfers the at least one function obtained by the controller to a host computer with which the device communicates.

Additionally, the present invention relates a computer system that includes a configurable computer input device. The input device includes at least one switch removably attachable to a surface and in communication with a processor. The surface includes at least one matrix of receptacles that the at least one switch is removably attachable to at a plurality of positions. The at least one switch may be repositioned on the matrix of receptacles at distances smaller than a length or width of the at least one switch. At least one function including at least one electronic, alphanumeric or keyboard function is assignable to activation of the switch. Circuitry communicates with the at least one switch for assigning at least one function to activation of the switch. Circuitry communicates the at least one function to a host computer. A memory stores data including a mapping of the position of the at least one switch in the at least one matrix of receptacles and the at least one function assigned to the at least one switch. Circuitry determines the actuation status of the at least one switch and communicates the actuation status to the processor. A host computer includes a microcomputer or a video game computer.

Furthermore, the present invention concerns a method for generating input to a computer. A configurable computer input device is provided including at least one switch removably attachable to a surface and in communication with a processor. At least one function is assignable to activation of the switch. The at least one switch may be repositioned on the surface at distances smaller than a length or width of the at least one switch. Circuitry communicates with the at least one switch for assigning at least one function to activation of the switch. Circuitry communicates the at least one function to a host computer. Circuitry determines the actuation status of the at least one switch and communicating the actuation status to the processor. At least one input is provided from an existing computer input device. At least one input is received from the existing computer input device. The at least one input from the existing computer input device is assigned to the at least one switch.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE DRAWINGS

The objects and advantages of the present invention will be more clearly understood when considered in conjunction with the accompanying drawings, in which:

FIG. 7 represents a table showing an embodiment of a distribution of matrix scanner row and column connections for a set of matrix pads accord according to the present invention;

FIG. 10 represents a block diagram illustrating an example of input and output details of an embodiment of a microcontroller development board that may be utilized according to the present invention;

FIG. 20B represents a close-up top view of the portion of an input device shown in FIG. 20A, illustrating an embodiment of a display, three control buttons, and a mode selection switch as they could appear during a macro mode according to the present invention;

DETAILED DESCRIPTION OF THE INVENTION

Figure 1:
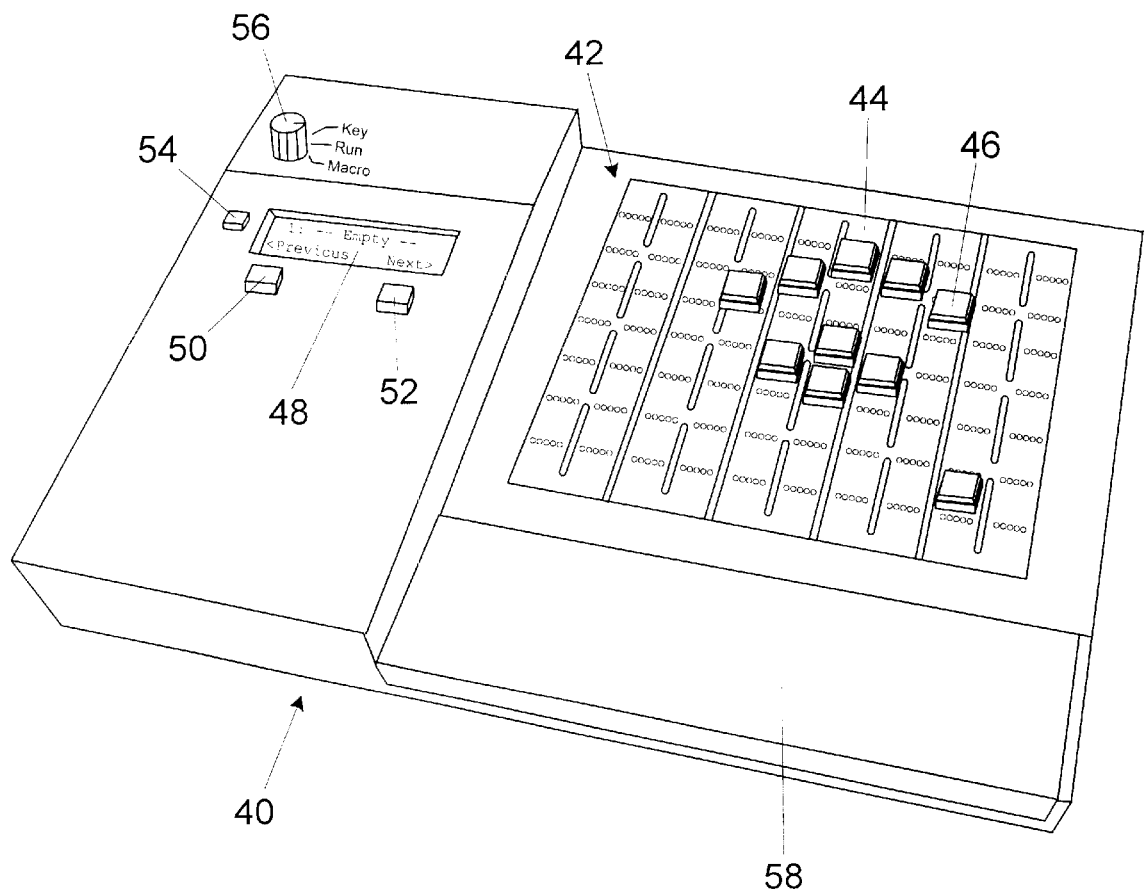
FIG. 1 represents a perspective view of an embodiment of a programmable computer input device according to the present invention.

The present invention provides a physically configurable and programmable and reprogrammable computer input device. As such, the present invention provides advantages that are unknown in computer input devices. Along these lines, traditional computer keyboards provide rigid, static, standardized, and generally inflexible devices. Known keyboards demand that users adapt to a single particular configuration or a limited number of specific alternate configurations. The same may be said of other computer input devices, such as game controllers, mice trackballs, and others.

The present invention overcomes these and other shortcomings of known computer input devices. Along these lines, the present invention has a number of objects and advantages. Every embodiment of the present invention need not exhibit each advantage or object. For that matter, is not necessary that an embodiment exhibit any of the object or advantage discussed below.

One advantage of the present invention it that it provides a computer input device that permits a user to specify the location of individual key switches and to change quickly and easily the location when desired. Another advantage of the present invention is that it provides a computer input device that permits fine adjustment of individual key switch locations, such that changes in location can be made that are smaller than the width or height of key switch. Along these lines, the keys, buttons, or other actuated members of a devices according to the present invention may be moved in non-whole number multiples of dimensions of the actuated members. The actuated members may also be located relative to each other at other than whole number multiples of dimensions of the actuated members.

Additionally, advantages of a computer input device according to the present invention can include that the device can provide for assignment or reassignment of each individual key switch function without affecting the assigned function of other key switches. Furthermore, a computer input device according to the present invention can permit a user to program any individual key switch to emulate at least one actuation of a key of a keyboard, including a macro of multiple key actuations. Input from other input devices other than a keyboard may also or alternatively be included in the functions of a key switch according to the present invention. Along these lines, an input device according to the present invention can provide a computer input device that allows users to program and store the function of separate key data sets and to allow the users to choose among these data sets, so that the users may employ the same or different key layouts with separate computer applications. Again, input from other input devices may alternatively or additionally be included in the data sets.

Still further, advantages of an input device according to the present invention can include providing a computer input device that does not require special software or device drivers to be installed on the host computer with which it is used. Also, the present invention can provide a computer input device that may operate in conjunction with a standard computer keyboard or other standard input devices, such that a user may continue to use these standard devices in a normal manner.

While there has been some attempt in the prior art to produce more dynamic keyboard layouts, such attempts fall far short of the input device according to the present invention. Along these lines, entire blocks of keys are exchanged for other blocks or with other devices, such as a trackball. Such devices do not permit rearrangement of the location or function of individual keys within the functional blocks of keys.

Other solutions have included keyboards in which one modular key may be exchanged with another. This replaceable key module design facilitates the exchange of a broken key with an operational one. However, the overall layout of the keys within the keyboard, and their relative positions, remains fixed. Each key position is predetermined by the manufacturer of the keyboard and there is a one-to-one relationship between each key module and its corresponding panel opening. In other words, relocation of the keys is not permitted.

Even devices that permit altering the function of a keyboard key include fixed key switches mounted in a keyboard matrix arrangement and do not permit the physical relocation or programmability of the input device according to the present invention. Along these lines, the design may require including a key switch at every potential location, thereby increasing the manufacturing complexity and cost of the keyboard. Also, the position of each key is limited to immovable switch positions determined by the manufacturer. When positioning individual key caps, the user merely has the option either to use a particular fixed switch, or to leave it empty. Such designs do not easily support fine adjustments to key position, characterized by changes smaller in scale than the width or height of a single key cap.

In a broad sense, the present invention includes a configurable computer input device. The device includes at least one switch removably attachable to a surface. The switch may be housed in a structure in the form of a key of a keyboard. Alternatively, the switch could be housed in a structure such as a button from a game controller. Such a button could have the shape of any game controller button. In reality, a switch according to the present invention could be housed in any structure. Along these lines, other forms that a switch may have include a button switch, a swiveling key-cap top, a tilting key-cap top, a swiveling and tilting key-cap top, and keyboard keys having non-standard shapes and sizes, such as in the shape of an arrow. Key cap labeling may also be utilized, applied directly to a key or inserted into a label sleeve on a key cap. Any other form may also be utilized.

A switch according to the present invention may be removably attached to a surface, referred to below as the attachment surface. The attachment surface can include any surface. For example, the present invention could include a switch, attached to virtually any surface. Examples of a surface include at least one of a mouse, a monitor, a keyboard, a desk, a work surface, a keyboard tray, a switch tray, a switch platform, a chair, a computer, a printer, and/or any other surface. Such a switch could be in wired or wireless communication with a processor and/or other circuitry.

A wireless key switch would not need to be plugged in to a typical matrix. Along these lines, wireless key switch modules use known broadcast techniques, such as radio-frequency or infra-red transmission, to indicate their activation status to a receiving unit. By including an attachable backing, such as an adhesive, suction, or magnetic surface, the wireless key switch modules allow the user to removably position individual keys in many useful and novel locations such as those described above. Any wired communication described herein could also be replaced with wireless communication means.

Other attachment surfaces may also be included in an input device according to the present invention. Along these lines, the attachment surface can include a matrix of receptacles. The matrix of receptacles may have a variety of shapes and sizes and may be housed in a variety of housings. For example, the matrix of receptacles may have a shape and be provided in a housing such as that illustrated in FIG. 1. Alternatively, the matrix of receptacles could have a size and be housed in a housing such as that illustrated in FIG. 23, where the matrix of receptacles has a size that permits it to be housed with a standard keyboard. The matrix of receptacles could also have a shape and size that permits it to be used with a video/computer game controller such as the embodiment illustrated in FIG. 24.

Figure 23:
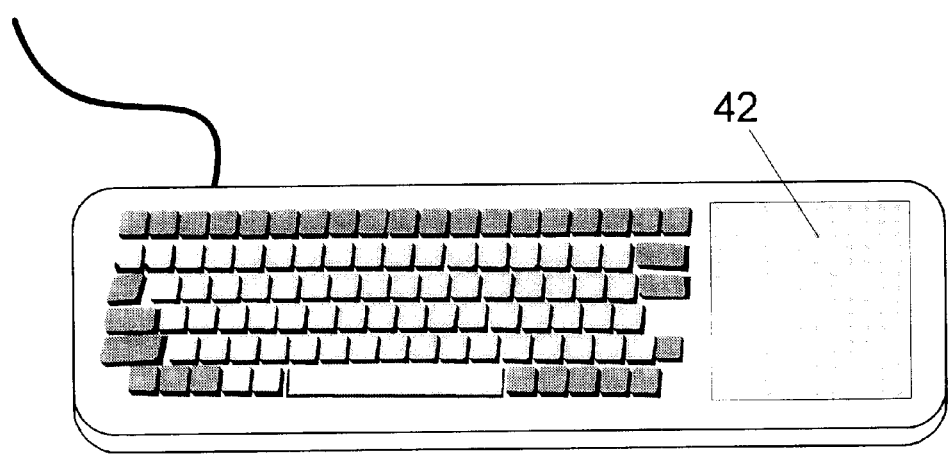
FIG. 23 represents a top view of an embodiment of the present invention including matrix of receptacles housed in an embodiment of a keyboard housing according to the present invention.

The present invention may be partially or fully incorporated into another computer input device. According to one embodiment, the device is incorporated with a standard keyboard, as shown in FIG. 23. As shown in FIG. 23, the matrix 42 may be included in the same housing as the standard key layout. Advantages of such an embodiment include the ability to use a single matrix scanner for both the standard keys and the added matrix locations. The combined design may also eliminate the need for external pass-through connections since the device may connect to the host computer 70 in the same manner as a standard keyboard.

In a further modification of this embodiment, one or more matrix pads 106 may share the row/column designation of keys on the standard keyboard 72. The functions of the matrix 42 positions may be assigned by the host computer, as described above, or an indicator could be used to differentiate signals sent by the matrix 42 from signals sent by the standard keyboard 72 keys.

As is apparent from the above discussion, the matrix of receptacles may be contiguous or non-contiguous. The matrix of receptacles may be planar. Alternatively or additionally, at least a portion of the matrix of receptacles may be non-planar.

Regardless of the shape and size of the matrix of receptacles, the matrix may receive pins extending from at least one switch. The pins may be attached to and electrically connected to the at least one switch. Significantly, as described in greater detail below, the receptacles and pins can permit the switches to be positioned at intervals smaller than the dimensions of the structures that house the switches. Along these lines, housing of the switches may be repositioned at distances other than whole number multiples of the dimensions of the switches. Typically, the dimensions of the housing of the switches are referred to herein as the dimensions of the switches.

Furthermore, if an input device according to the present invention includes more than one switch, the switches may be arranged on the matrix of receptacles such that they are not aligned. However, switches may be aligned if desired. In some embodiments, some switches may be aligned while others are not. This is one of the great advantages of the present invention; the switches may be arranged as desired by a user.

At least one function is assignable and/or reassignable to activation of the at least one switch included in an input device according to the present invention. The at least one function can include at least one input provided to a computer. Along these lines, the at least one function can include any electronic, alphanumeric, or keyboard function. Along these lines, the at least one function can include at least one function including movement of a joystick, actuation of a mouse button, actuation of a button or other member on a game controller, and/or actuation of a keyboard key. The at least one function could also include any other input from any other computer input device.

Figure 24:
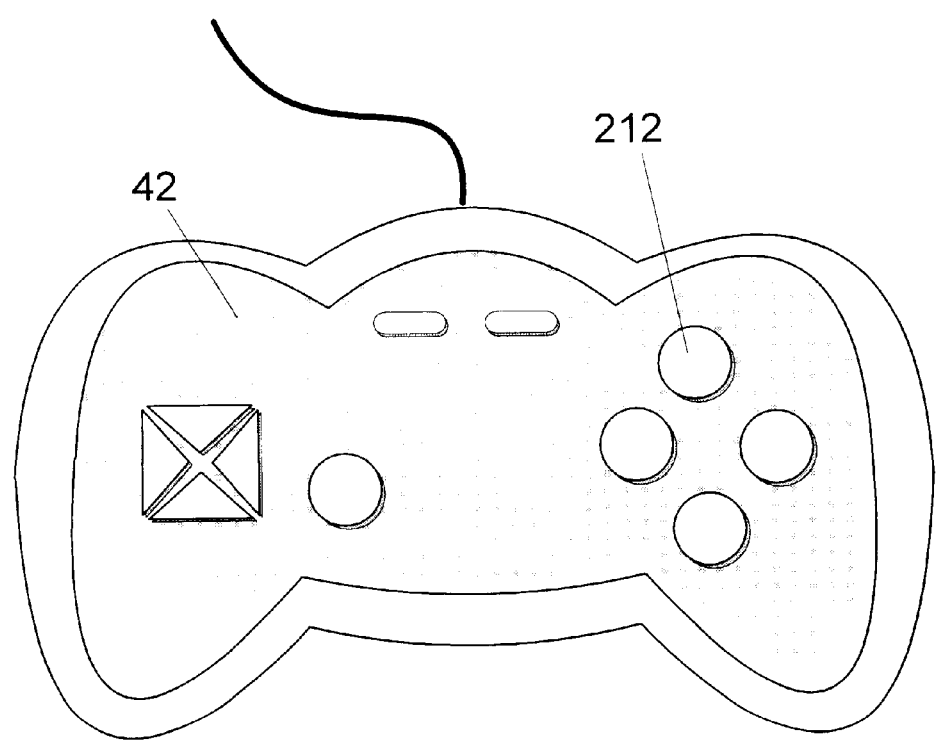
FIG. 24 represents a top view of an embodiment of the present invention including a matrix of receptacles housed in an embodiment of a game controller according to the present invention.

With respect to use of the present invention with other computer input devices including joysticks and game controllers, FIG. 24 illustrates an example of another input device that the present invention may be utilized with. Many common game controllers, including those made by Sega, Nintendo, Sony, and Atari, provide fixed switch positions that frequently are not comfortable to use, especially for children who typically have smaller hands than adults. Providing a matrix 42 with various game controller switches 212, and using the standard game controller interfaces, the present invention can allow a user to define their own game controller layout. This design may be utilized with analog and digital controller input functions.

Not only can the function include any one or more of the above functions, it can also include timing, cadence, and sequence of functions. Along these lines, function could include how hard a keyboard key is struck, the length of time the key is depressed, and the timing to the next stroke. This type of timed macro could reproduce both a key sequence and timing between key presses. Such a macro could be useful for game applications where key input timing is important. The direction that a joystick is moved and other variables could also be represented by the at least one function. In a computer game scenario, pushing one button on a device according to the present invention could result in a spaceship turning with a certain speed while moving in a certain direction and firing a certain gun with a selected rapidity, among other functions. A device according to the present invention could be modified to operate for chord key input. In such a configuration, input functions may be programmed to simultaneous combinations of key presses and/or other inputs instead of just single key presses or other input. As apparent from the above discussion, the possibilities for functions of the present invention are endless.

A configurable computer input device according to the present invention also includes circuitry in communication with the at least one switch for assigning at least one function to activation of the switch. The at least one function is discussed above in greater detail. The nature of the circuitry is discussed below in greater detail. Although, as discussed above, the communication between the function assigning circuitry and the at least one switch may be wired or wireless.

Additionally, an input device according to the present invention may include circuitry for communicating the at least one function to a host computer. As with the communication between the function assigning circuitry and the at least one switch, the communication between the host computer and the circuitry for communication the at least one function to the host computer may be wired or wireless. While a "host computer" is referred to herein, it is not necessary that the host computer actually be a traditional microcomputer. The host computer could be a video game console, or any other device.

In addition to the above circuitry, an input device according to the present invention may also include circuitry for determining the actuation status of the at least one switch and communicating the actuation status to a processor. As with the communication between the function assigning circuitry and the at least one switch, the communication between the processor and the circuitry for communicating the actuation status of the at least one switch to the processor may be wired or wireless. The actuation status determining circuitry may scan the at least one switch to determine the status of the switch. Functioning of this and other circuitry is discussed below in greater detail.

An input device may also include memory for data storage. The data can include a mapping of the position of the at least one switch in the at least one matrix of receptacles and the at least one function assigned to the at least one switch. An input device according to the present invention where the attachment surface includes a matrix of receptacles typically includes a memory. The mapping of functions may also reside in the memory of the host computer.

To facilitate control of operation of an input device according to the present invention may include a controller. Among the functions that a controller may carry out are receiving the actuation status of the at least one switch, determining the function assigned to activation of the switch, and transmitting the at least one function to the circuitry for communicating the at least one function to the host computer. A controller may also carry out any other desired function.

In determining the function assigned or mapped to the at least one switch, the controller may consult a memory such as the memory described above. The controller may then transfer the function to the circuitry for communicating the function to the host computer.

A significant advantage of an input device according to the present invention is that the at least one switch of the input device may be operated nearly simultaneously with other input devices, such as keyboards, mice, and trackballs, in communication with the host computer. Many computer input devices do not operate in such a manner. Rather, generating input on an existing computer input device prevents the possibility of generating input on another input device. The computer will not receive the additional input.

The present invention also includes a method for generating input to a computer. The method includes providing at least one input from a computer input device other than the input device of the present invention. As described above, examples of such input devices include keyboards, mice, joysticks, and game controllers, among others. The at least one input is recorded. Then, the at least one input is assigned to the at least one switch of an input device according to the present invention, wherein actuation of the at least one switch results in the at least one input. The at least one switch is then actuated, providing the at least one input to the computer.

As described above, an input device according to the present invention permits keys, or switches more generically, to be arranged in any desired arrangement. In many cases, the arrangement of keys on a keyboard, game controller, or other input device is not the most desirable for a particular user and/or carrying out a particular function. One example of a desired function-key layout for aligning geometrical shapes in a graphics program is shown as follows:

| Top-Left | Top Center | Top-Right |
| Left | Center-Middle Middle | Right |
| Bottom-Left | Bottom | Bottom-Right |

The positioning shown above is unavailable with the traditional function key group that is fixed across the top or to the left of a standard alphanumeric keypad.

The present invention solves the above and other problems by providing a computer input device that permits a user to position individual key switches in a custom manner and to program the individual function of those key switches. The key switch layout and function can be changed easily to suit the needs of the user. Typically, the invention uses standard interface protocols, thereby eliminating the need to employ special device driver(s) or interpretation software on a host computer. Furthermore, the present invention permits standard input devices, such as keyboards, to be used concurrently and without noticeable interference.

The present invention will now be explained in greater detail with respect to one particular embodiment and some alternate embodiments. These embodiments and the discussion are illustrative of the present invention and should by no means be interpreted as the only embodiments. The principles described below can apply to other embodiments. Also, alternative means for accomplishing structures and functions described below are possible. Those of ordinary skill in the art would be able to make substitutions and/or deletions without undue experimentation.

FIG. 1 offers a perspective view of one embodiment of the present invention. The embodiment illustrated in FIG. 1 includes a housing 40. This embodiment includes an attachment surface that includes a matrix of receptacles.

The matrix of receptacles is contained within the housing. Along these lines, the matrix of receptacles in the embodiment shown in FIG. 1 is arranged at top of the housing 40. This embodiment of the matrix of receptacles includes five solderless breadboard terminal strips, or terminal strips 44. Such strips are available from Digi-Key Corporation of Thief River Falls, Minn., among other sources.

The terminal strips 44 may be connected to the housing 40 in a rectangular block, to form the matrix of receptacles or key-switch plug-in matrix, or matrix 42. The matrix 42 provides a plug-in surface to receive a plurality of modular positionable key switch assemblies, or key switch modules 46. A user may reposition the key switch modules 46 within the matrix 42. The terminal strips 44 described here are modified for their use in the present invention. One example of a detailed description of the matrix design and construction is provided below.

Figure 26:
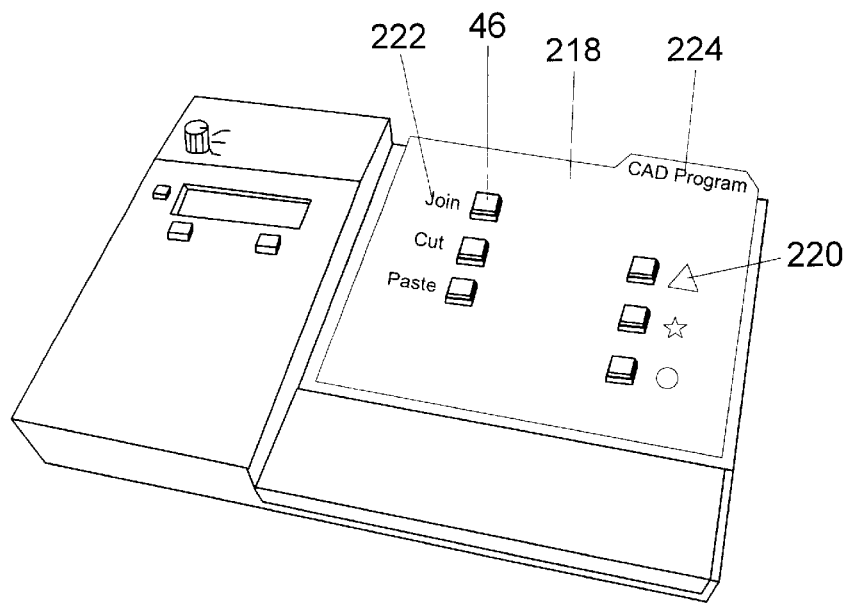
FIG. 26 represents a perspective view of an embodiment of an input device according to the present invention that includes an embodiment of an overlay card mounted on the device.

To facilitate use of the present invention, an overlay card 218 may be used to indicate the programmed functions of the key switch modules 46. FIG. 26 illustrates an embodiment of an overlay card. The overlay card 218 may include well-known functional indicators such as symbols 220, functional labels 222, and configuration identification labels 224. Separate overlay cards 218 may be applied for different data set configurations of the device. An overlay card could be utilized with any embodiment of the present invention. For example, an overlay card could be utilized with a game controller or the embodiment illustrated in FIG. 23, or any other embodiment.

The present invention may also include a display. The display can assist in the operation of the device. Along these lines, the display can provide a readout of keystrokes that comprise a function assigned to actuation of a switch of the input device.

In the embodiment illustrated in FIG. 1, the display is arranged in the housing 40 along with the matrix 42. This embodiment of a display includes a liquid crystal display, or LCD 48. Any other display may also be utilized, if the device includes a display. The embodiment of the display 48 shown in FIG. 1 displays device status and programming information to the user. The display may also display other function(s).

As described above, the present invention also includes a method for generating input to a host computer. For controlling the operation of an input device, including programming and subsequent provision of input to a host computer, an input device according to the present invention may include at least one control element. The at least one control element can determine whether the input device is "learning" the at least one function that is to be assigned to the at least one switch, operating to permit actuation of the at least one switch to carry out the at least one function, or perform other function(s).

The embodiment shown in FIG. 1 includes a plurality of controls. Along these lines, the embodiment shown in FIG. 1 includes a left selection button, or left button 50; a right selection button, or right button 52; a label button 54; and a rotary mode selection switch, or mode switch 56. The left button 50 and right button 52 can permit a user to select a data set of the device.

The present invention may also include a label button 54, which allows the user to input the displayed name of the selected device data set. A mode switch may be included to permit a user to choose an operation mode of the device. Possible operational modes can include programming modes and operational modes. One program mode permits programming a single key to a switch position. Another programming mode could permit programming a macro, or plurality of functions, to a switch position. Another example of a mode includes a run or functional mode, wherein actuation of the at least one switch results in the desired input to a host computer.

The housing 40 may also include a wrist rest 58 to make using the device more comfortable.

Figure 2:
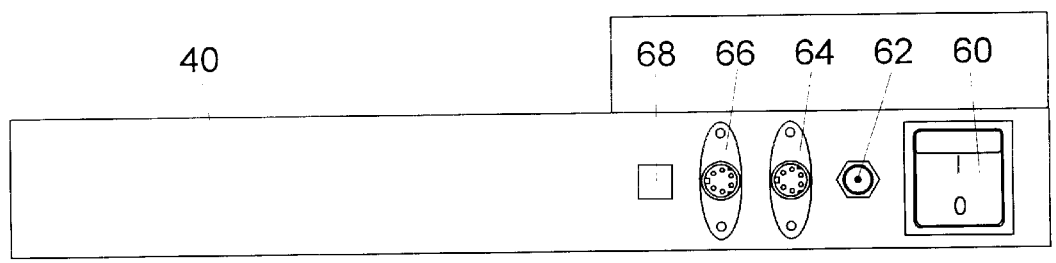
FIG. 2 represents a rear view illustrating connection and control locations that may be included in the embodiment of the invention shown in FIG. 1.

FIG. 2 illustrates a rear view of the embodiment shown in FIG. 1. As illustrated in FIG. 2, an input device according to the present invention may include at least one connector for making wired connections between a device according to the invention and a host computer or other device. Whether or not an input device according to the present invention includes a connector, the connections between the device and a host computer or other device may be wireless.

The embodiment shown in FIG. 2 includes a plurality of connectors. These connectors include a power connector 62, a host computer connector or host connector 64, and a keyboard connector 66. The power connector 62 in the embodiment shown in FIG. 2 is a male center-post connector designed to receive a 5-Volt, 0.8 Amp, direct-current power source to power the device. Although with certain design changes it is possible to use power provided directly by the host computer, as with most standard keyboards, an external power source is included in this embodiment to provide a more generous power budget.

Additional operational controls may also be included on the rear of a device according to the present invention. Along these lines, as shown in FIG. 2, a device according to the present invention may include a clear data set or clear button 68 that permits a user to erase all programmed switch positions within a selected data set. The device may also include a power switch 60. The power switch 60 may be used to apply or remove electrical power to the device, turning the device on or off. It is not necessary that such operational controls are located on the rear of the device; they could be provided on any other surface. The controls could also take different forms, such as touch pads.

It is not even necessary that the device include such controls. Along these lines, clearing a function could take place automatically when a new function is entered. Also, if the device were powered directly by a host computer, in a manner similar to a standard computer keyboard, then the power switch would be superfluous.

To permit a device to be in wired connection with a host computer, keyboard, and/or other device(s), the device according to the present invention could include at least one connector. Along these lines, the rear of the device may include such connectors. For example, the embodiment shown in FIG. 2 includes a connector 64 for connecting the device to a host computer and connector 66 for connecting a keyboard to the device. The device according to the present invention may include more or less connectors.

Any type of connectors may be utilized according to the present invention. For example, host connector 64 and keyboard connector 66 may be PS/2 style female connectors. Such connectors are typically known in the art as six-position miniature-DIN connectors. One source of such connectors is Digi-Key.

Figure 3:
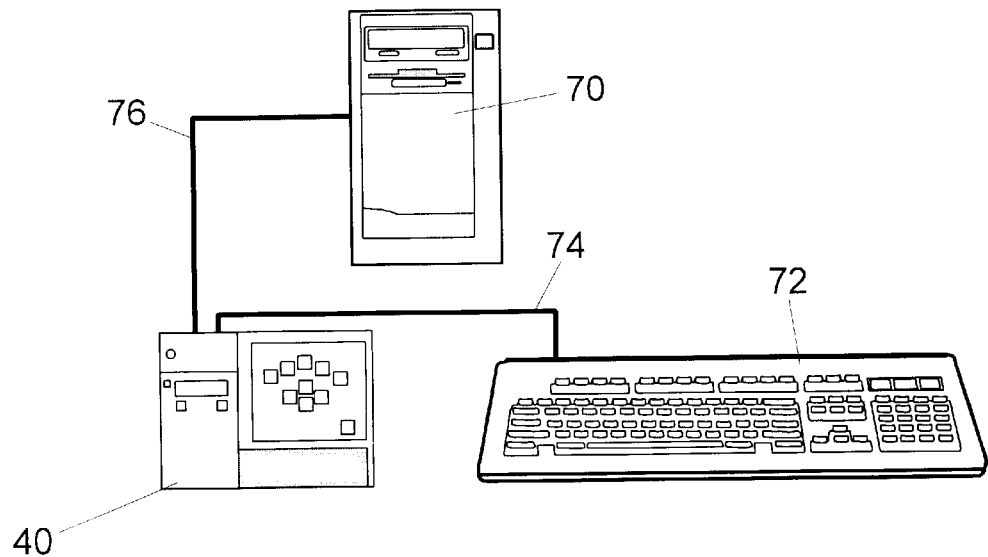
FIG. 3 represents an embodiment of a system according to the present invention.

In the embodiment of the present invention shown in FIG. 3, the device is connected between a host computer 70 and a standard keyboard 72. A typical keyboard connection cable 74, which usually connects directly to a PS/2 keyboard port (not shown) of the host computer 70, instead connects to the keyboard connector 66 of the device according to the present invention. A host connection cable 76 links the device from the host connector 64 to the keyboard port of the host computer 70. As described in this basic embodiment, the device can act as a wedge between the standard keyboard 72 and the host computer 70. The device can relay both the data signals generated by the attached standard keyboard 72 and its own data signals directly to the keyboard port of the host computer 70. However, other arrangements and data transmission paths are also possible.

The device according to the present invention can be compatible with computers and keyboards operating under the widely used PS/2, or PC AT, standard keyboard communication protocol, originally defined by International Business Machines Corporation of Armonk, N.Y. However, one of ordinary skill in the art could modify the present invention without undue experimentation to use any other standard or custom keyboard communication protocol.

Examples of other protocols include IBM PC XT standard, Apple Desktop Bus keyboard interface, ASCII parallel keyboard interface, standard serial port keyboard interface, and Universal Serial Bus (USB) keyboard interface.

Figure 4:
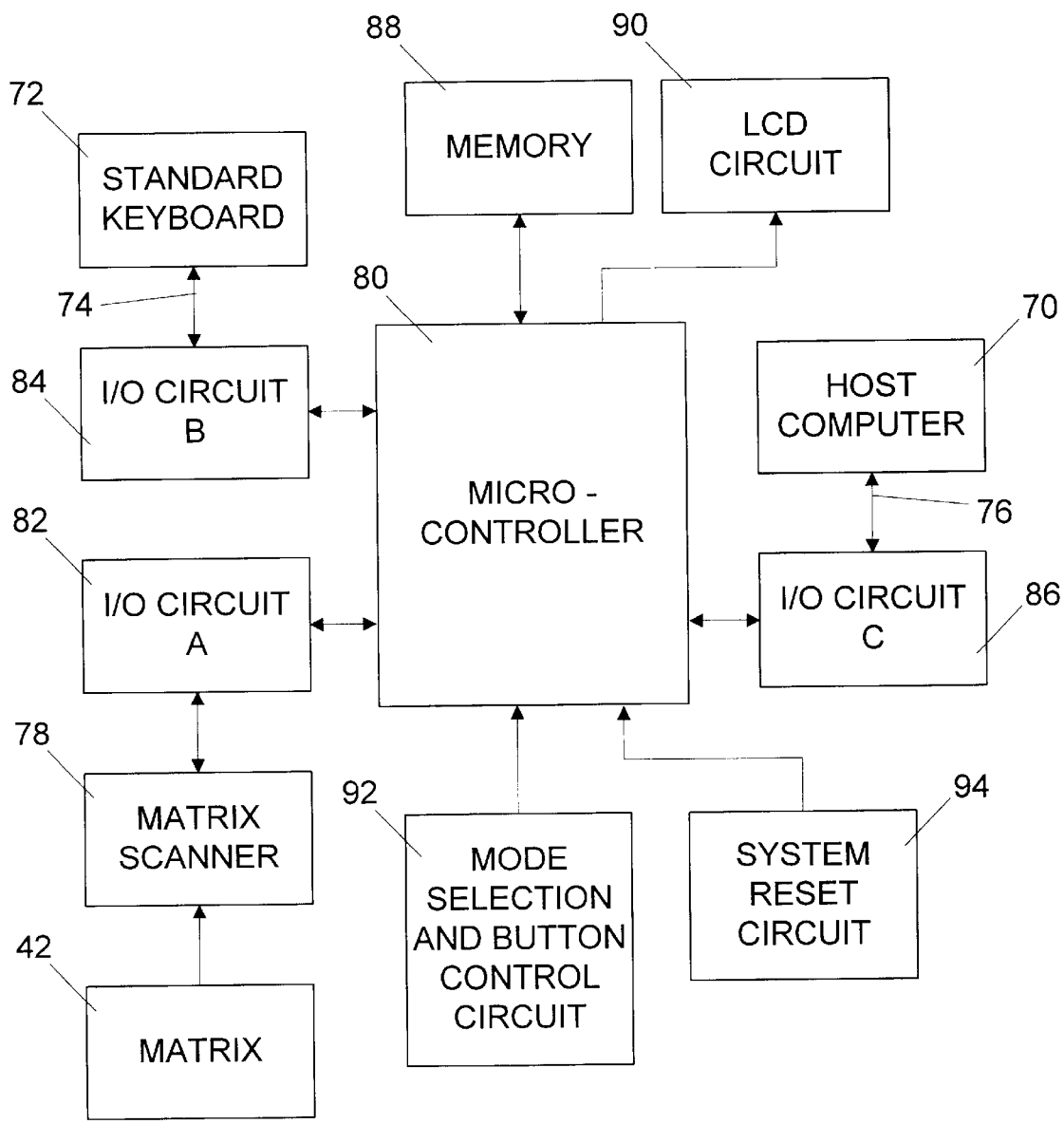
FIG. 4 represents a block diagram that illustrates functional components that may be included in an embodiment of a programmable computer input device according to the present invention.

The block diagram in FIG. 4 shows one possible relationship among major functional components of an embodiment of a system according to the present invention. This embodiment includes an attachment surface that includes a matrix of receptacles described above. The matrix, such as matrix 42 shown in FIG. 1, may be scanned by a matrix scanner 78 to determine the location of any pressed key switch modules 46. The matrix scanner represents an example of an embodiment of circuitry for determining the actuation status of the at least one switch.

The position of any activated key switch modules 46 detected by the matrix scanner 78 may be sent to a microcontroller development board, or microcontroller 80 through an input/output circuit A 82. Data may be transferred between the standard keyboard 72 and the microcontroller 80 through an input/output circuit B 84. Also, data may be transferred between the host computer 70 and the microcontroller 80 through an input/output circuit C 86. A memory 88 may be divided into a code space and a data space to provide for both the control software and storage requirements of the microcontroller 80.

An LCD circuit 90 can permit information from the microcontroller 80 to be displayed on a display, which in this case is an LCD 48 shown in FIG. 1. A mode selection and button control circuit 92, which includes the left button 50, the right button 52, the label button 54, the mode switch 56, and the clear button 68, provides means for the user to input commands to the microcontroller 80. Finally, a system-reset circuit 94 provides means to initialize the device status.

Figure 5:
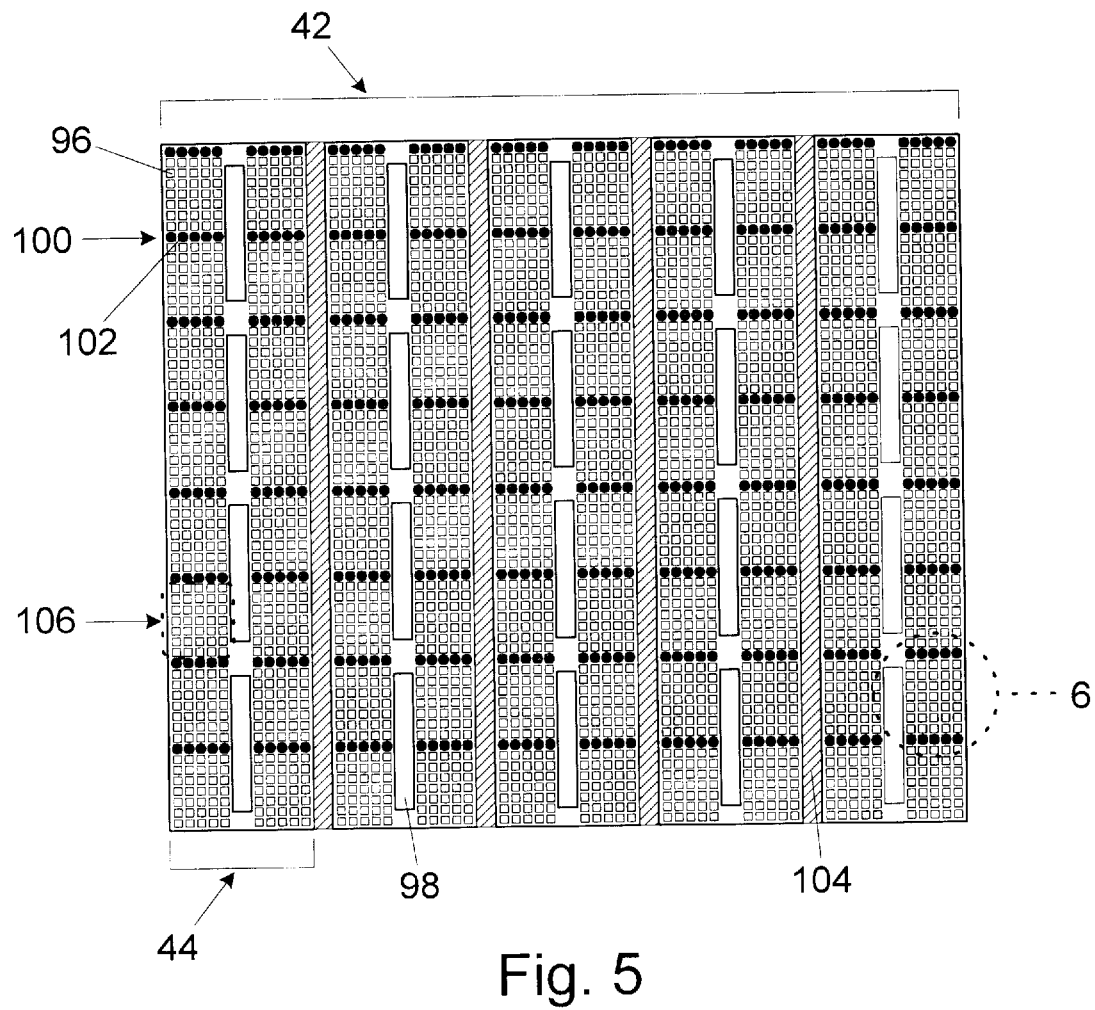
FIG. 5 represents an overhead view of an embodiment of an attachment surface according to the present invention that includes a matrix of connections.

FIG. 5 provides a more detailed image of the matrix of receptacles 42 illustrated in FIG. 1. As stated earlier, the matrix 42 may include five vertical terminal strips 44 arranged in a rectangular block. Each terminal strip 44 may be separated from an adjacent strip with a spacer 104. Solderless terminal strips are well known in the art. Such strips are customarily used for the design, construction, and testing of prototype electrical circuits by providing a means to connect electrical components temporarily.

Integrated-circuit pins, wires, or other electrical components connected to the at least one switch may be inserted into a connection hole of a terminal strip. A metallic spring clip at the base of the hole can be provided to form both an electrical and a mechanical connection to the component(s) through contact friction. A standard, unmodified terminal strip typically includes sixty-four rows of ten solderless connection tie points, or tie points, 96 split evenly into two columns by a central divider 98.

The terminal strips 44 that may be included in a device according to the present invention can be modified to include framing rows 100. The framing rows 100 may be formed by inserting tie-point plugs 102 into the tie points 96 of every eighth row of the matrix 42. The tie-point plugs 102 may be utilized to inhibit use of tie points 96 in a framing row 100 when selecting a position for a key switch module 46 in the matrix 42. The tie point plugs 102 may be manufactured by cutting the round, flat ends of common steel fabric pins to a length such that they may be inserted into the tie points 96 of framing rows 100, effectively blocking their use. The tie-point plugs 102 typically lie flush with the surface of the matrix 42.

As shown in FIG. 5, framing rows 100, central dividers 98, spacers 104, and edges of the matrix 42 may combine to form an array of matrix pads, or pads, 106. Each pad 106 may include a grid of thirty-five tie-points 96 arranged in seven rows and five columns. The pads 106 may be the useable portions of the matrix 42 into which the key switch modules 46 may be inserted.

Many different matrix designs may be substituted for the matrix 42 shown in FIG. 5. One embodiment may utilize a matrix 42 that maps each tie-point 96 separately to a matrix scanner 78, eliminating the pads 106, and a corresponding need for framing rows 100, spacers 104, and central dividers 98 described in the basic embodiment. This embodiment provides a slightly greater freedom in key switch module 46 placement, at the expense of an increase in the number of tie points 96 monitored.

According to another embodiment, the matrix 42 design may be modified from the planar, rectilinear structure described in the basic embodiment. The matrix 42 design may incorporate any reasonable morphology or topology. Furthermore, the matrix 42 design does not need to be contiguous.

Figure 21:
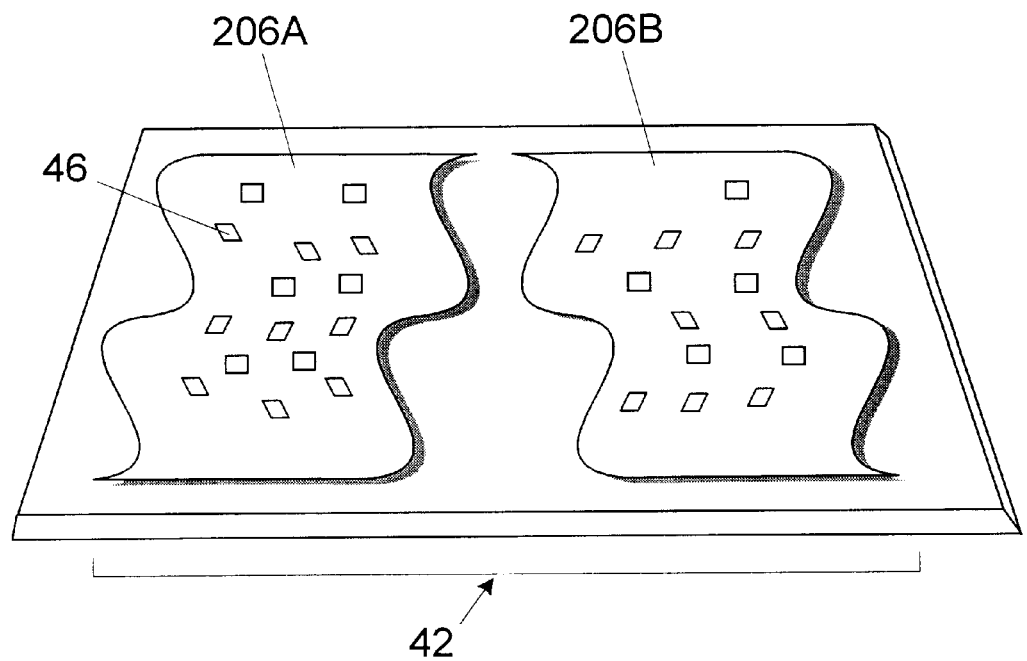
FIG. 21 represents a perspective view of an embodiment of the present invention that includes a non-contiguous, curved, two-handed attachment surface that includes a matrix of receptacles arranged in two separate regions according to the present invention.

Along these lines, two or more separate regions of the matrix may be used to supply convenient areas where key switch modules may be inserted and monitored. For example, FIG. 21 illustrates a "two-handed" matrix 42 design with separate matrix regions 206A and 206B, one for a left hand and one for a right hand. The matrix regions 206A, 206B have curved surfaces to provide the user with a wide choice in selecting comfortable hand positions. Key switch modules 46 may be positioned anywhere within these regions.

Figure 6:
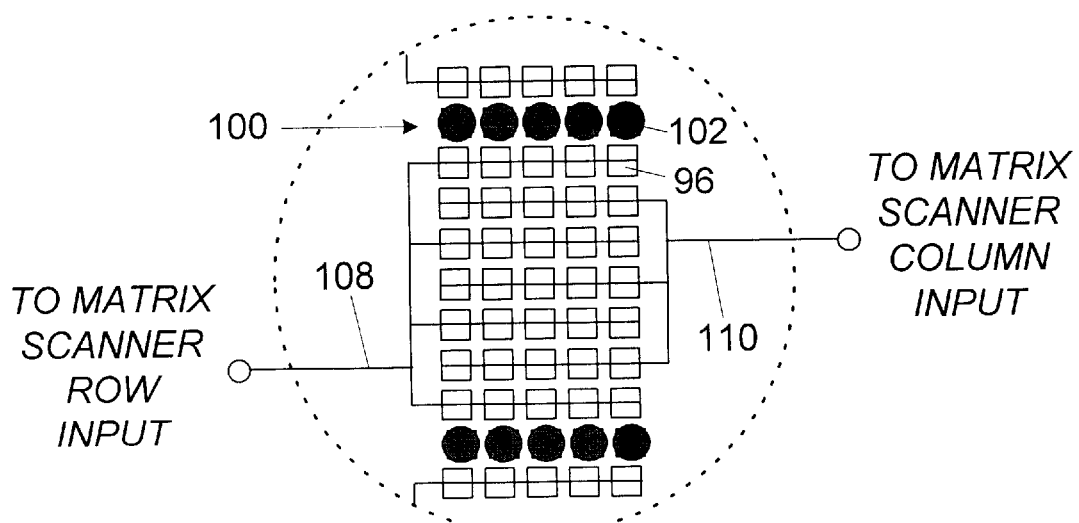
FIG. 6 represent a close-up view of a portion of the embodiment of the attachment surface illustrated in FIG. 5, showing an embodiment of electrical connections that may be included in a matrix of connections.

FIG. 6 represents a close-up view of a portion of the matrix of receptacles circled in FIG. 5. As shown in FIG. 6, the terminal strips 44 may be modified such that alternating rows within the pad 106 are connected electrically. A matrix scanner row data line, or row line, 108 may connect the first, third, fifth, and seventh rows of tie points 96 within the pad 106. A matrix scanner column data line, or column line, 110 may connect the second, fourth, and sixth rows of tie points 96 within the pad 106. Neither the row line 108 nor the column line 110 are typically visible from the top of the matrix pad. The line schematics added to FIG. 6 are for illustrative purposes. The electrical connections for the row line 108 and the column line 110 to the tie points 96 may be created by first removing the adhesive backing from the bottom of the terminal strips 44 to expose the back of the embedded metallic spring clips. Jumper wires may then be soldered directly to the tie-point spring clips, electrically joining the alternating rows as shown in FIG. 6. Of course, any other means that provides the desired connections may also be utilized.

The row line 108 from each pad 106 may be connected to a row input of the matrix scanner 78. The column line 110 from each pad 106 may be connected to a column input of matrix scanner 78. The matrix scanner 78 used for this embodiment may be a keyboard controller circuit. Such a circuit could be obtained from an existing keyboard. One example of such a keyboard is a Chiconey Pro Keyboard, Part #70082, available from a retail outlet of CompUSA, Inc. of Dallas Tex.

The matrix scanner 78, like many generic keyboard controllers, typically accepts "row" and "column" inputs to identify a key press from a standard keyboard. Each key in a standard keyboard may be assigned both a row and a column. Pressing or actuating a key connects the assigned row and column lines, uniquely identifying the key. Although multiple keys may be assigned the same row line or the same column line, each key has a unique row-column combination.

The matrix scanner 78 utilized in this embodiment of the present invention contains eighteen column inputs, 0 through 17, and eight row inputs, 0 through 7. These input lines may be reassigned to scan the matrix 42 as shown in the table in FIG. 7. Each box in the table may correspond to the position of a pad 106 in the matrix 42.

The boxes in the table have four lines that describe an original key assignment 112, a hexadecimal byte code 114, a row input number 116, and a column input number 118. The original key assignment 112 lists the name of the standard key that originally was associated with the given combination of row input number 116 and column input number 118 prior to salvaging the matrix scanner 78 for this embodiment. The hexadecimal byte code 114 lists the byte code generated by the matrix scanner 78 for the given combination of row input number 116 and column input number 118. As shown by the table, each pad 106 in the matrix 42 has a unique row-column designation and, therefore, a unique hexadecimal byte code 114 representation from the matrix scanner 78. This unique hexadecimal byte code 114 may be used by the microcontroller 80 to determine which pad 106 was activated by a key press from an inserted key switch module 46.

Figure 8A:
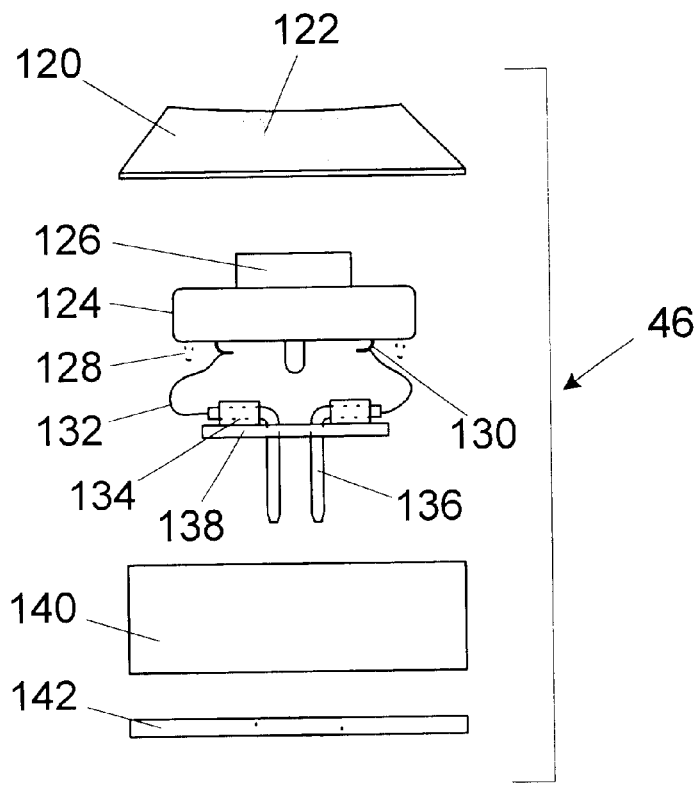
FIG. 8A represents an exploded side view of an embodiment of key switch module components according to the present invention.
Figure 8B:
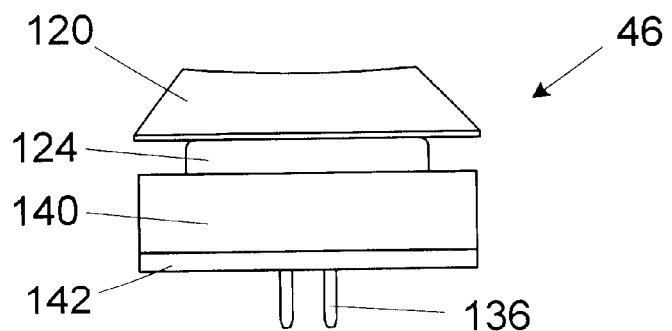
FIG. 8B represents a side view of an embodiment of an assembled key switch module according to the present invention.
Figure 8C:
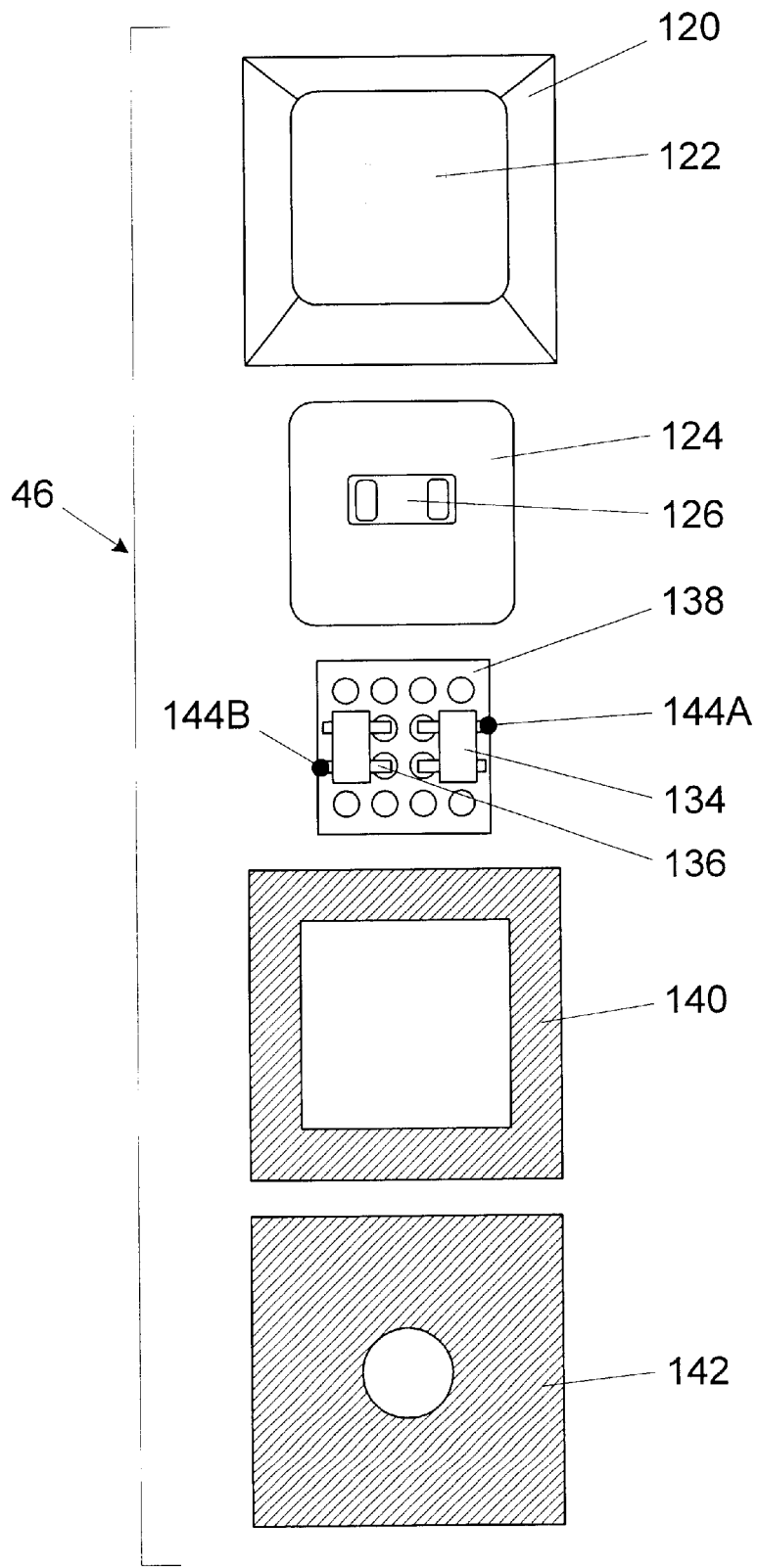
FIG. 8C represents an exploded top view of an embodiment of key switch module components according to the present invention.

FIG. 8A, FIG. 8B, and FIG. 8C show different views of an embodiment of a design of the key switch module 46 according to the present invention. Along these lines, FIG. 8A represents an exploded side view of the key switch module 46. Also, FIG. 8B represents an assembled side view of the key switch module 46. Additionally, FIG. 8C contains an exploded top view of the key switch module 46. The functional components can include a key cap 120, key cap tabs 122, a switch 124, a switch plunger 126, alignment pins 128, switch contact leads 130, wires 132, right angle headers 134, header pins 136; a base 138; a shroud 140, and a foot 142. It should be remembered that this represents only one embodiment of a switch and associated elements that may be included in an embodiment of the present invention. Those of ordinary skill in the art would understand how to make modifications or substitutions of various components of the switch shown in FIGS. 8A, 8B, and 8C without undue experimentation once aware of the disclosure contained herein.

According to one embodiment, the key switch modules 46 may be constructed as follows. A standard piece of epoxy-glass composite perforated circuit mounting board, such as board having 0.1-inch hole spacing, available from Digi-Key Corporation, may be cut to create the "four hole by four hole" square base 138. Two right angle headers 134, such as headers having 0.1 inch spacing and being gold plated and being available from Digi-Key Corporation, may be secured with epoxy adhesive to the base 138. The headers may be secured such that the header pins 136 extend through the central holes in the base 138, as shown in FIG. 8A and FIG. 8C.

The alignment pins 128 may be removed from the switch 124. One example of the switch is the ML series, normally-open, ultra-low-profile key switch available from Cherry Corporation of Waukegan, Ill. The switch contact leads 130 may be connected with the wires 132 to two diagonally opposed header pins at solder points 144A and 144B, as shown in FIG. 8C. The remaining two header pins 136 may not be connected to the switch contact leads 130. Rather, they may be included for extra structural support when the key switch module 46 is connected to the matrix 42.

The switch 124, base 138, and right angle headers 134 may be inserted into the center of the shroud 140. The foot 142 may then be applied to the bottom of the assembly. The components may be aligned such that the header pins 136 are centered in the circular opening of the foot 142 and the top of the key switch 124 rises higher than the lip of the shroud 140. Once the components are aligned, the remaining space within the shroud 140 may be filled. One example of a material that may be used to fill the space is epoxy, which would then need to cure. Finally, the key cap 120 may be added by inserting the key cap tabs 122 into the corresponding holes in the key switch plunger. FIG. 8B represents a side view of the assembled key switch module 46.

Figure 9:
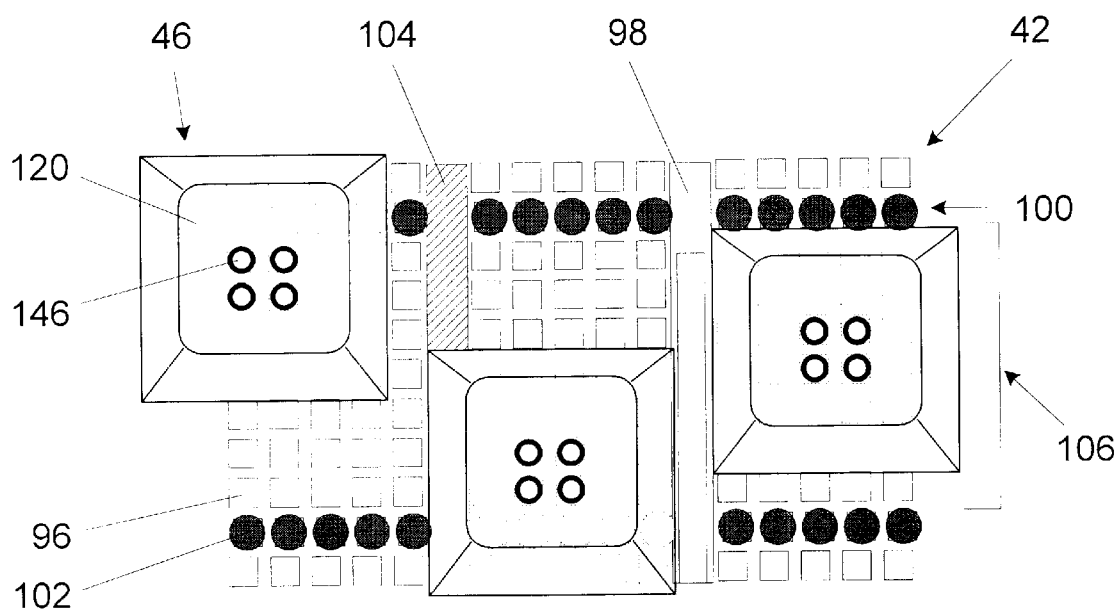
FIG. 9 represents a top view of three key switch modules according to an embodiment of the present invention in relation to an embodiment of an attachment surface that includes a matrix of receptacles, illustrating some different ways individual key switch modules may be positioned into the matrix.

As stated above, the present invention permits switches to be arranged in any desired arrangement. FIG. 9 illustrates one possibility of this. Along these lines, FIG. 9 represents a top view showing three examples of how key switch modules 46 may be inserted into the pads 106. Footprint circles 146 are included in FIG. 9 to illustrate the approximate location of the header pins beneath the key switch modules 46.

Proper key switch module 46 placement typically requires that all four headers pins 136 are inserted fully into available tie points 96 of a single pad 106. The edge of the key switch module 46 may overlap the framing row 100, the spacer 104, the central divider 98, or the edge of the matrix 42. As shown in FIG. 9, it is even possible for the edge of the key switch module 46 to overlap another adjacent pad 106.

Furthermore, although only a single orientation is shown, the key switch module 46 also may be inserted into the pad 106 in any of four separate orthogonal rotations. Along these lines, a key switch module 46 may be rotated 90, 180, or 270 degrees around its vertical axis, as compared to the arrangements shown in FIG. 9. Geometrical constraints prevent more than one key switch module 46 from being placed into the same pad 106. Additionally, the framing row 100, the spacer 104, and the central divider 98 in the embodiment shown in FIG. 9 prevent a single key switch module 46 from connecting two separate pads 106.

The complimentary "diagonal" wiring of the header pins 136 and the "alternating row" wiring of the pads 106 means that however the key switch module 46 is positioned within a pad 106, depressing the key cap 120 will close a connection between two adjacent lines in the pad 106, connecting a row input line 108, shown in FIG. 6, to a column input line 110, shown in FIG. 6. This design permits the matrix scanner to use the pads 106 to identify uniquely any activated key switch module 46 properly inserted into the matrix 42.

The matrix 42 design described above and shown in FIGS. 1, 5, 6, and 9 offers many advantages. Among the advantages are that the design includes significantly fewer individual nodes that a matrix scanner 78 must monitor. The flexibility of the key switch module 46 placement for the present invention may be substantially similar to a pure matrix design. However, by dividing the matrix 42 into separate pads 106, the matrix scanner 78 in this embodiment needs only to monitor 80 unique locations rather than individually monitoring all 2,800 of the open tie points 96. This allows use of readily available, and much slower, keyboard controller circuits, generally lowering the device cost and level of complexity.

Notwithstanding the above, FIG. 9 and the above description only illustrate one possible design of a matrix 42 and key switch modules 46. The description and illustration do not preclude other possible matrix designs. Along these lines, the matrix may include a matrix of individual tie points, each of which are mapped separately by a matrix scanner. Such a design could eliminate the need for pads 106 and framing rows 100. Those of ordinary skill in the art could determine alternative embodiments of the matrix, connections, and scanner without undue experimentation once aware of the disclosure contained herein.

As discussed above, the matrix scanner 78 can monitor the matrix 42 and transmit key actuation data to a microcontroller 80. One example of a microcontroller 80 that may be utilized with the present invention is a High-Speed Microcontroller Development system available from Systronix, Inc. of Salt Lake City, Utah. However, any suitable microcontroller may be utilized.

The microcontroller includes a microprocessor. One example of a microprocessor that may be utilized according to the present invention is a Dallas Semiconductor Corporation 80C320 clocked at 33 MHz. Of course, any suitable microprocessor may be utilized.

The microcontroller 80 typically includes memory for storing various data for operation of the device. Along these lines, the microprocessor may include 128 kilobytes of non-volatile random access memory 88 and on-board input/output (I/O) pins and program loader logic. The memory 88 is retained during the power-off state with an on board capacitor. Of course, any type and amount of memory may be utilized. Possible arrangements and functions of the memory are described in greater detail below.

The block diagram in FIG. 10 illustrates the I/O pins available on the microcontroller 80. The names assigned to pins P1.0 through P3.7 correspond to the pin variable names used in the source code provided in Appendix A.

The functions of the microcontroller and associated microprocessor and memory may be carried out by the host computer.

Figure 11:
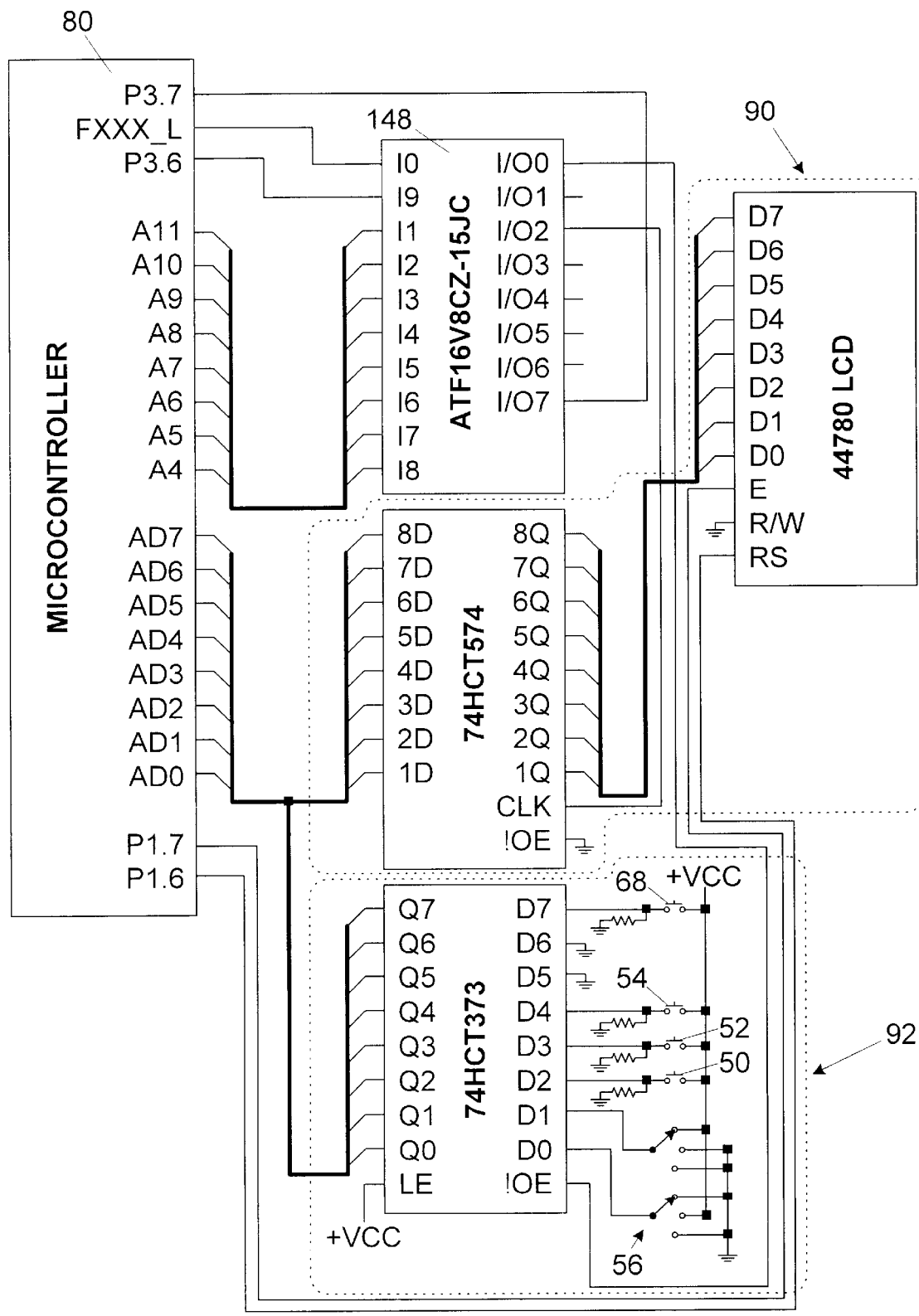
FIG. 11 represents an electrical schematic diagram illustrating an embodiment of input/output (I/O) circuits for an embodiment of a liquid crystal display and for an embodiment of a mode selection and button control circuit according to the present invention.

FIG. 11 represents a schematic drawing that illustrates a display circuit in the form of an LCD circuit 90 and a mode selection and button control circuit 92. The LCD circuit 90 may include an interface. One example of an interface is a Hitachi 44780 interface, configured for a two-line by sixteen-character LCD 48 display, available from Systronix, Inc.

The mode selection and button control circuit 92 may include the left button 50, the right button 52, the label button 54, the clear button 68, and the mode switch 56. The four buttons typically are all normally open momentary push buttons. Such buttons are available, from Digi-Key Corporation, among other suppliers.

According to one embodiment, the mode switch 56 is a two-pole, six position rotary switch. Three positions may be locked out since they may not be required according to this embodiment. One example of such a switch is available from Radio Shack, a subsidiary of the Tandy Corporation of Fort Worth, Tex.

The microcontroller 80 can send data to the LCD circuit 90 and read data from the mode selection and button control circuit 92 through memory-mapped I/O controlled by a programmable logic device (PLD) address decoder chip 148. One example of such a chip is available from Systronix Inc., with part number ATF16V8CZ-15JC. Of course, as with any component described herein, this represents just one example of a chip that may be utilized according to the present invention.

Figure 12:
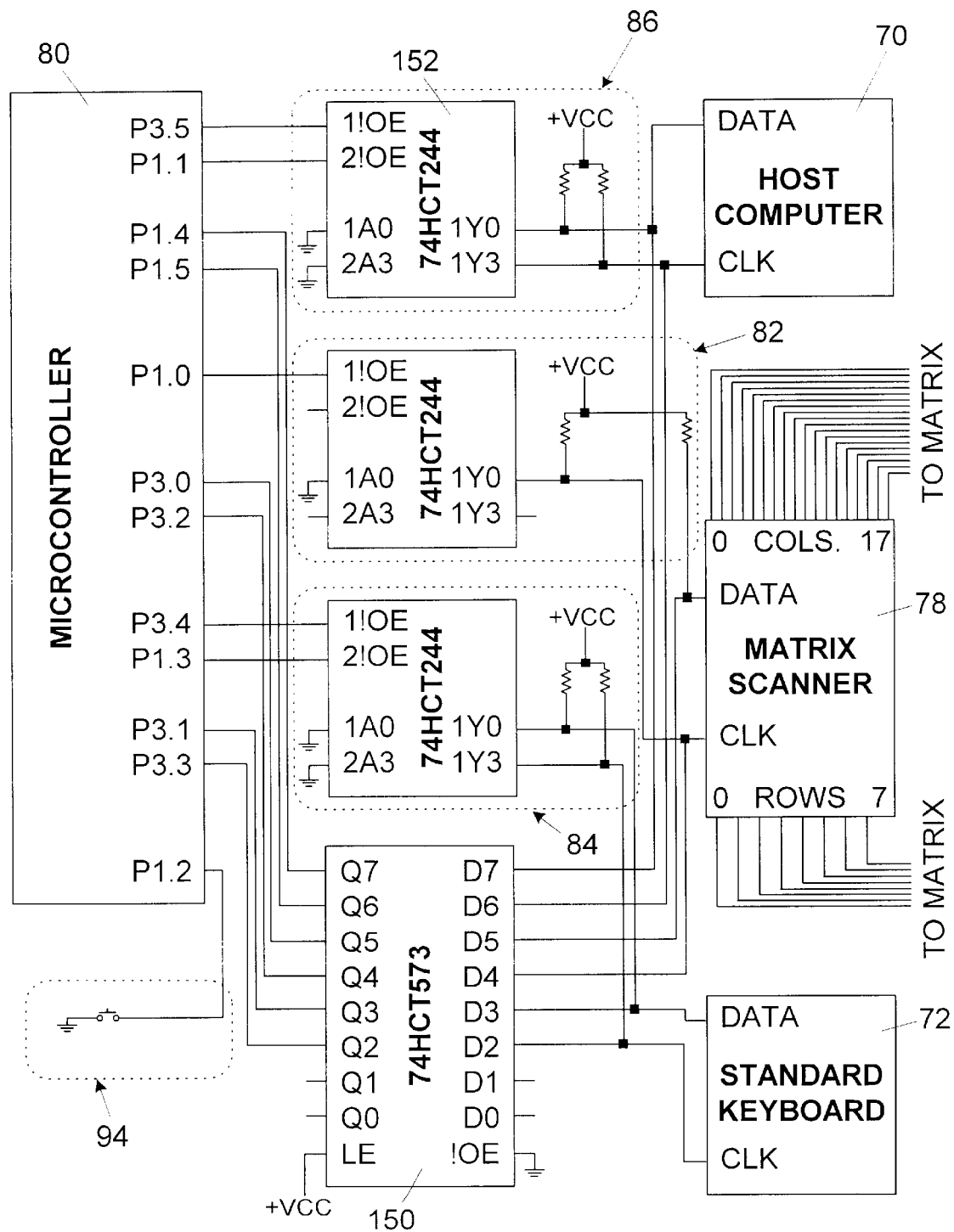
FIG. 12 represents an electrical schematic diagram showing an embodiment of I/O circuits among a host computer, a matrix scanner, a standard keyboard, and a microcontroller; and a system reset circuit according to the present invention.

The electrical schematic in FIG. 12 shows an embodiment of I/O circuits 82, 84, 86 and a system reset circuit 94 that may be included in an input device according to the present invention. As described previously, an input/output circuit A 82 may be utilized to transfer data to and from a matrix scanner 78. An input/output circuit B 84 may be included to transfer data to and from a standard keyboard 72. An input/output circuit C 86 may be employed to transfer data to and from a host computer 70.

Although not included in their respective dashed boxes, each of the three I/O circuits may also utilize a non-inverting transparent latch 150 for input to the microcontroller 80. One example of such a latch is a CMOS 74HCT573 Logic Device, available from Radio Shack Corporation. Each of the I/O circuits may use the non-inverting transparent latch 150 as an input buffer to read the status of the clock and data lines from the input devices.

The I/O circuits may each use a separate three-state line driver 152 for output from the microcontroller 80. One example of such a driver is a CMOS 74HCT244 Logic Device, available from Radio Shack Corporation. The three-state line driver 152 may be utilized to drive a corresponding digital clock and data lines low (logic zero) for output.

The system reset circuit 94 may be located inside the housing 40 and typically is not available to the user. The reset typically is used only after control software is loaded onto the microcontroller 80 to initiate a memory initialization routine. The "System Reset" routine of the source code listing in Appendix A provides more information on the memory initialization routine.

Figure 13:
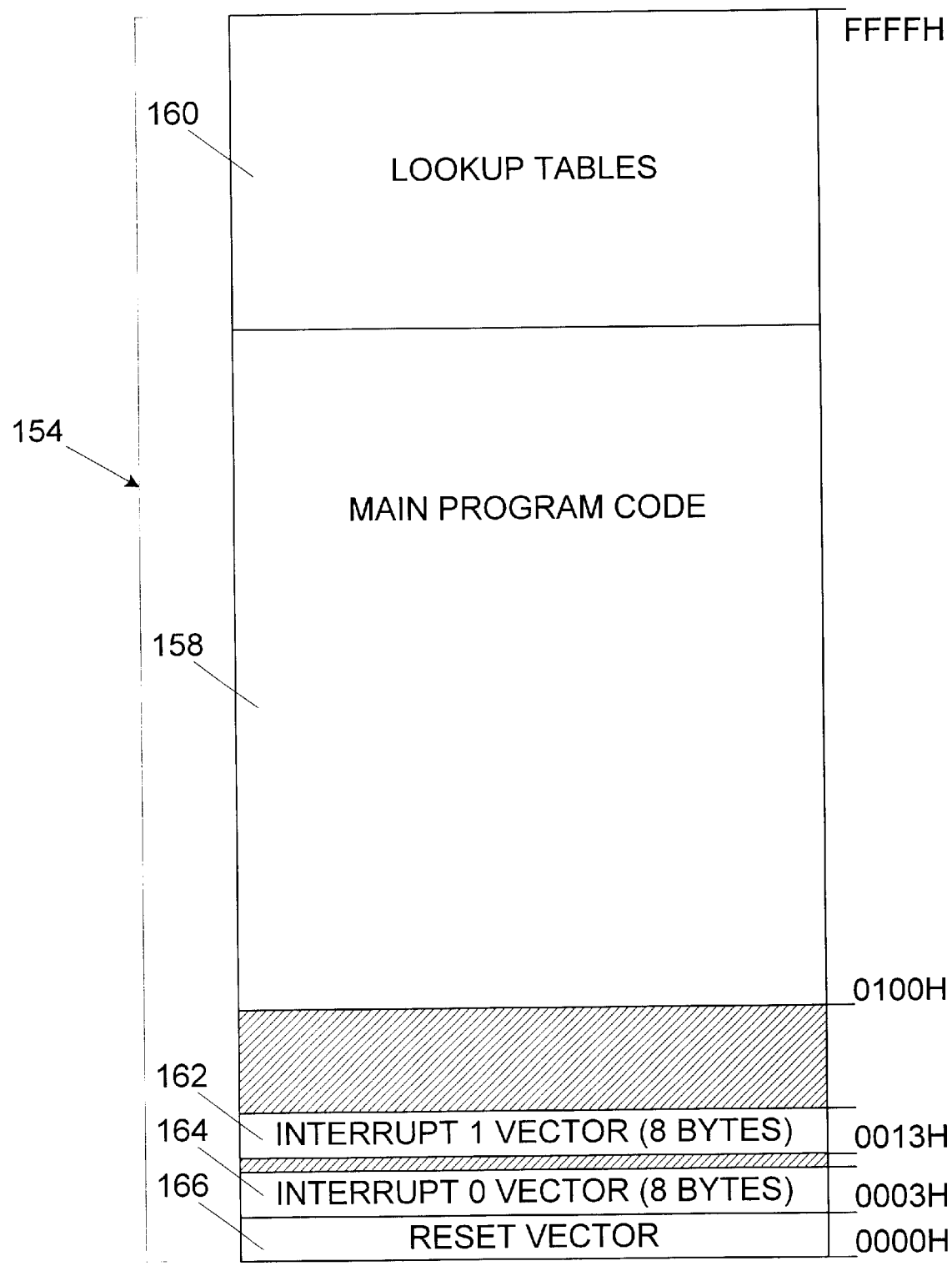
FIG. 13 represents a block diagram illustrating an embodiment of a data memory usage map according to the present invention.
Figure 14:
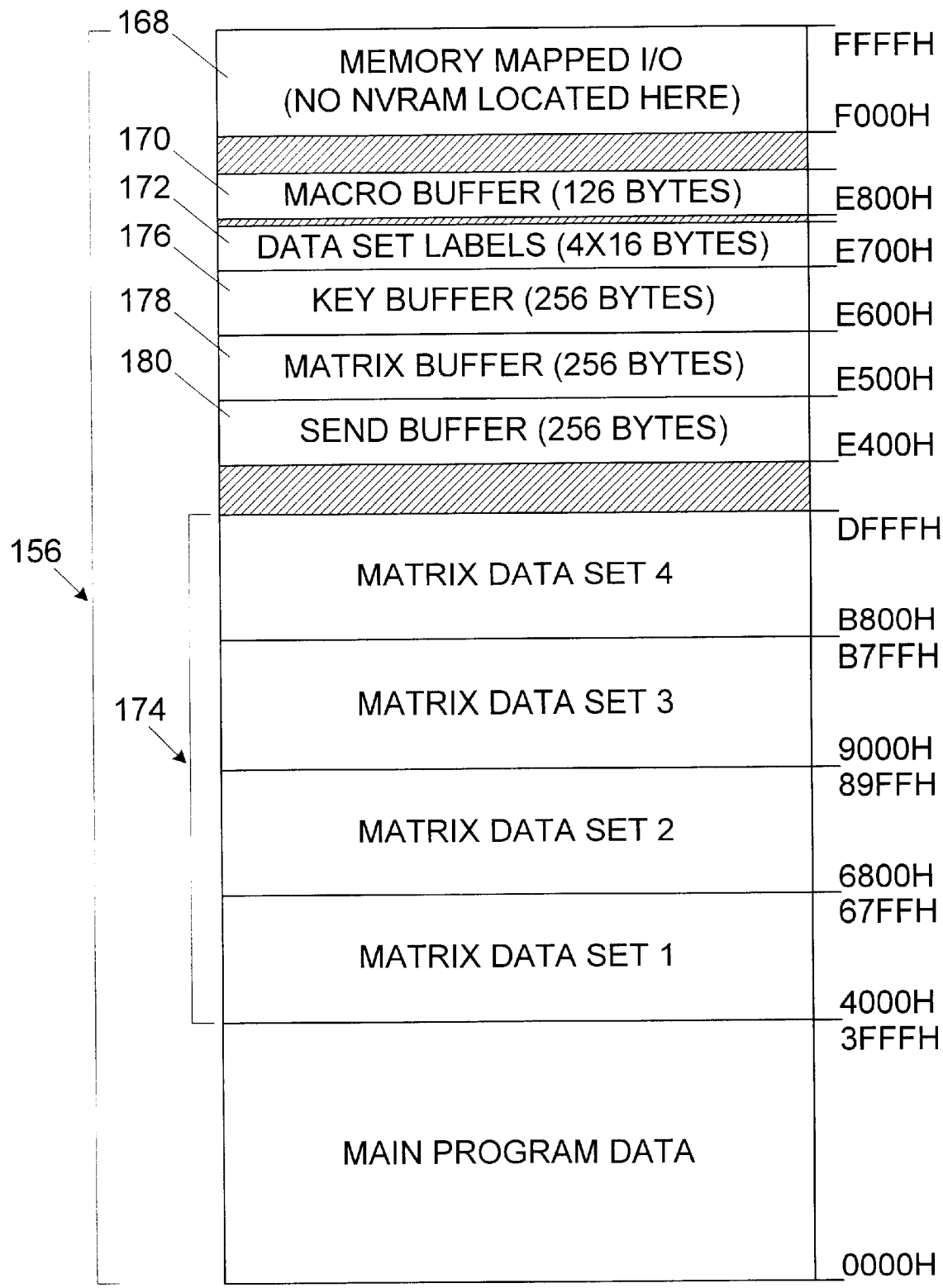
FIG. 14 represents a block diagram illustrating an embodiment of a code memory usage map according to the present invention.

As stated above, the hardware described above may be directed by a microcontroller 80. The microcontroller may execute commands of the control software stored in the memory 88, also referred to above. The memory 88 may be split into a block of 64 kilobytes of code memory 154, as shown in FIG. 13, and a block of 64 kilobytes of data memory 156, as shown in FIG. 14. Referring to FIG. 13, the code memory 154 may store a main program code 158, lookup tables 160, an interrupt one (INT1) vector 162, an interrupt zero (INT0) vector 164, and a reset vector 166.

The main program code 158 can include all the instructions needed by the microcontroller 80 to operate a device according to the present invention. The instructions can include the interrupt service routines that retrieve data from the standard keyboard 72 (via INT1) and the matrix scanner 78 (via INT0). Lookup tables 160 may be used by the control software to retrieve from the data memory 156 data associated with a programmed pad 106. The two interrupt vectors may redirect the program instruction pointer to the appropriate interrupt service routines whenever an interrupt is generated by activity on the matrix scanner 78 or the standard keyboard 72 clock lines. The reset vector 166 may direct the program instruction pointer to the start of the control software at power up or restart of the microcontroller 80.

A complete listing of an embodiment of control software source code that may be utilized according to the present invention is provided in Appendix A. The source code is a hybrid of BASIC and Assembly Language. BASIC is used for the overall program flow control and string manipulation while in-line Assembly language is used for speed sensitive operations. The source code was compiled using the BCI51™PRO BASIC Cross Compiler, Version 1.40, available from Systronix, Inc. Details for transferring the compiled control software to the code memory 154 are provided with documentation associated with the Cross Compiler. Of course, if the functions carried out by the controller are accomplished by a host computer, then the discussion herein of the controller, memory, software and other associated elements does not apply.

FIG. 14 represents a block diagram showing an allocation of the data memory 156. Memory-mapped I/O addresses 168 may reside at the top four kilobytes of the data memory 156 and may be used to access the LCD circuit 90 and the mode selection and button control circuit 92. A macro buffer 170 may temporarily store macros as they are generated by a user until the macros are assigned to a particular pad 106 location.

A data set label bank 172, may hold the strings identifying the four matrix data sets 174 available for use. The matrix data sets 174 can effectively provide four completely independent key configurations. For example, a user may use one matrix data set 174 for a spreadsheet application and change to another matrix data set 174 for a word processing application.

Each of the four matrix data sets 174 can provide 126 bytes of storage for each pad 106 in the matrix 42. The user may use one of the matrix data sets 174 at a time and may change between them using the left button 50 and right button 52, as shown in FIG. 1 and FIG. 11. Keyboard buffer 176, matrix buffer 178, and send buffer 180 may each provide a 256 byte circular buffer to store and transfer the standard keyboard 72 data and the matrix scanner 78 data to the host computer 70. The bottom sixteen kilobytes may be reserved for variables defined in the control software.

Flow diagrams illustrated in FIGS. 15–19 present an example of a general overview of an embodiment of microcontroller 80 control software operation. It should be noted that these flow diagrams only portray the functions necessary to convey a broad understanding of one embodiment of the present invention. The full source code documentation, provided in Appendix A, reveals more detail about the control software operation according to one embodiment for carrying out these functions. Software functions not discussed in the flow diagrams shown in FIGS. 15–19, but included in the source code, include data collision detection; keyboard status light operation, such as caps lock, number lock, and scroll lock; data storage address calculation; and memory coding and storage schemes.

Figure 15:
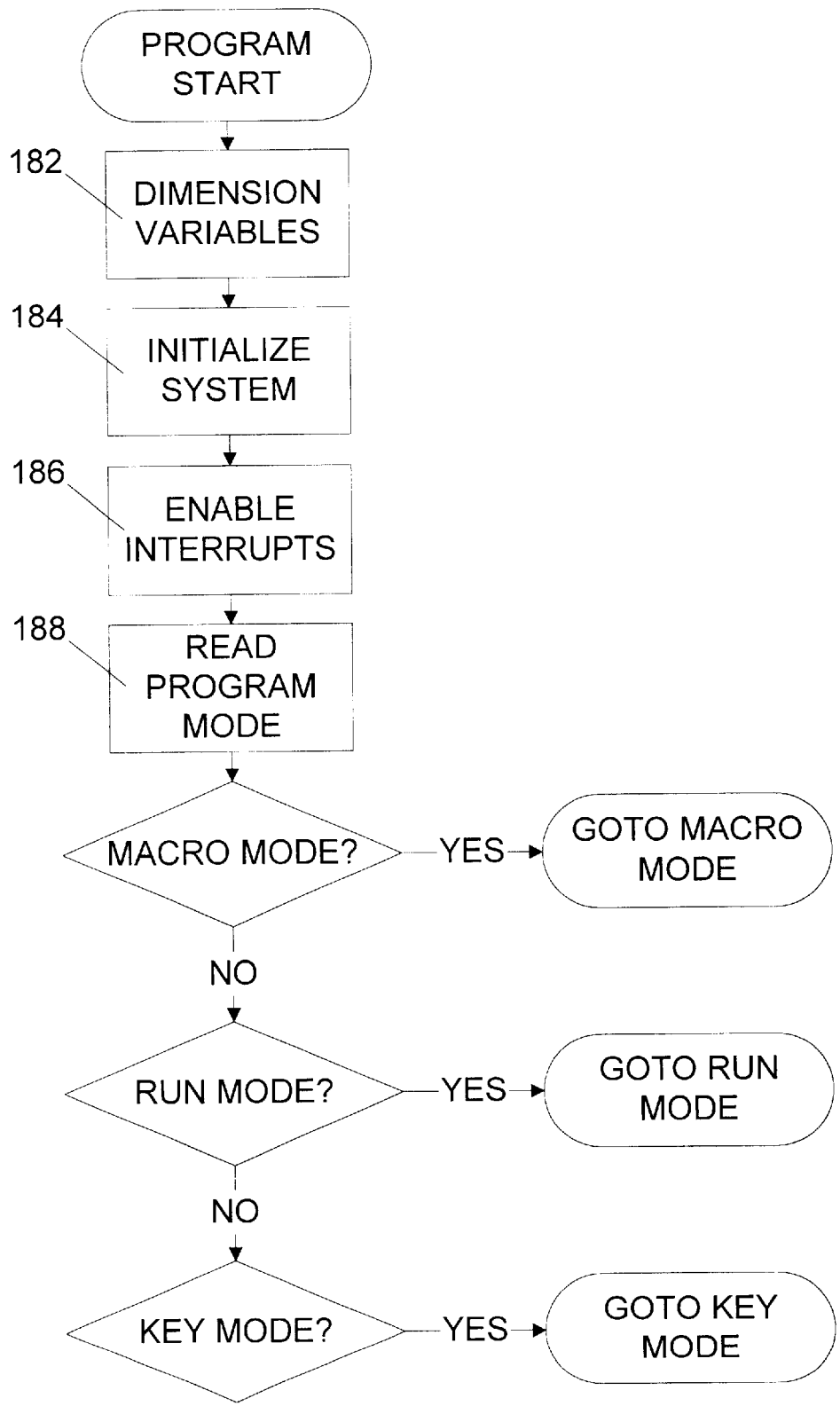
FIG. 15 represents a flowchart outlining an embodiment of a program startup process according to the present invention.

The flow diagram of FIG. 15 shows the start-up process of the microcontroller 80. At power on, the microcontroller 80 may dimension the system variables 182, initialize the system settings 184, including the display 48 and I/O ports, and enable the interrupts 186. Next, the microcontroller may read the program mode 188 indicated by the mode switch 56. The microcontroller 80 may branch to the software routine for one of the three possible modes, a run mode 192, shown in FIG. 17, a key mode 194, shown in FIG. 18, or a macro mode 196, shown in FIG. 19.

Two interrupts (INT0 and INT1) may be utilized according to the present invention. Along these lines, INT0 may be connected to the clock line of the matrix scanner 78. Additionally, INT1 may be connected to the clock line of the standard keyboard 72. When data traffic is sent from the matrix scanner 78 or the standard keyboard 72, triggered by a falling edge on the clock line, the main program execution may be paused while the program jumps to the calling interrupt service routine to process the interrupt.

Figure 16:
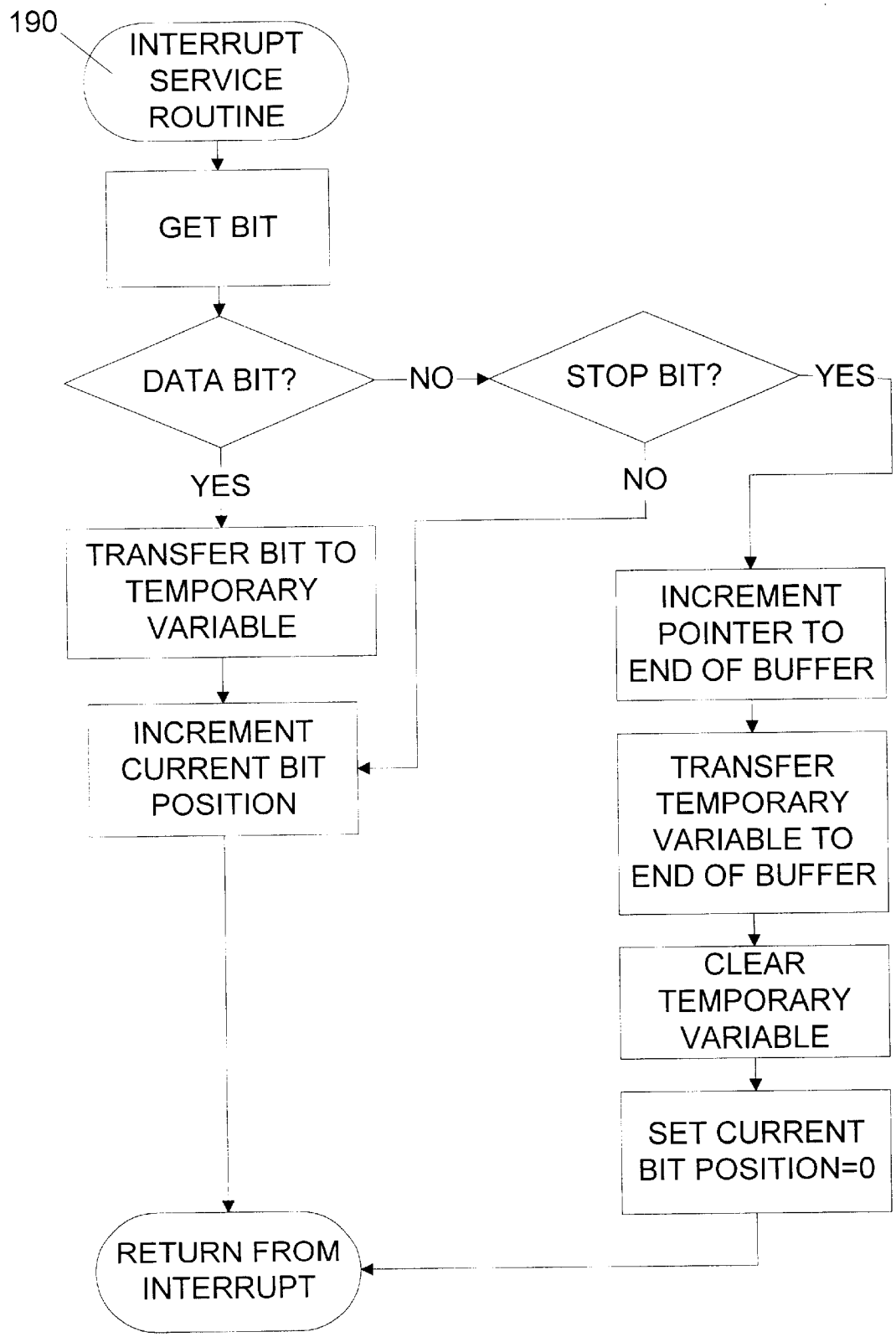
FIG. 16 represents a flowchart outlining an embodiment of program interrupt service routines according to the present invention.

The flow diagram shown in FIG. 16 illustrates an embodiment of a process that may be followed during an interrupt service routine, or ISR 190. Each time the ISR 190 is called, another bit from the data traffic may be acquired and stored in a temporary variable. Once an entire byte of data is received, the value may be transferred from the temporary variable to the end of the appropriate circular buffer, and the temporary variable may be cleared. Data captured by INT0 may be transferred to the matrix buffer 178. On the other hand, data captured by INT1 may be transferred to the keyboard buffer 176.

Figure 17:
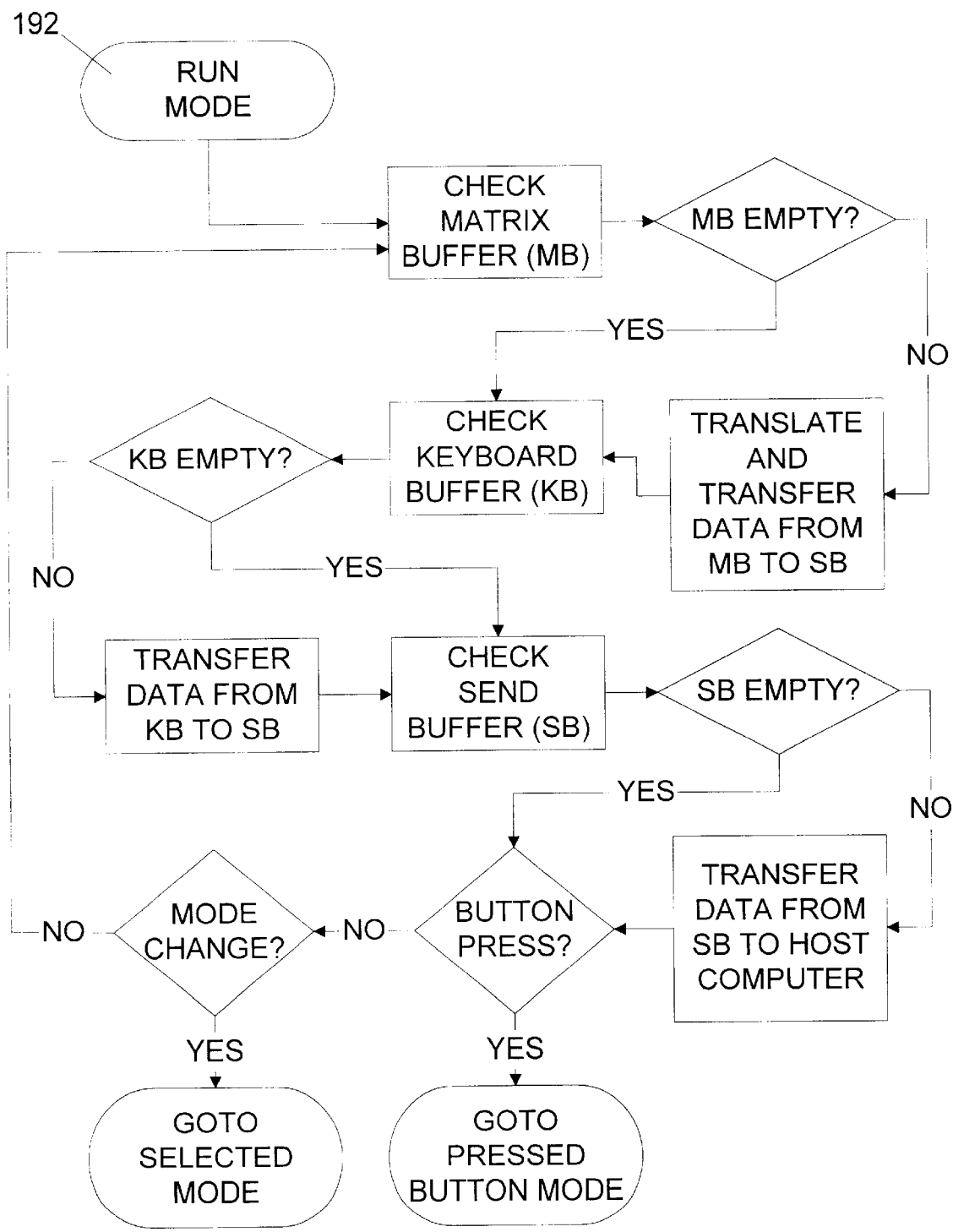
FIG. 17 represents a flowchart outlining an embodiment of a program run mode routine according to the present invention.

The flow diagram shown in FIG. 17 illustrates an embodiment of operation of the microcontroller 80 during the run mode 192. The run mode 192 is the functional mode for the device. As shown in the diagram, the microcontroller 80 may repeatedly loop through the run mode routine checking the contents of the matrix buffer 178, the keyboard buffer 176, and the send buffer 180. During this looping process, if the user activates a key switch module 46 on the matrix 42, the matrix scanner 78 may transmit the corresponding byte to the microcontroller 80, triggering INT0 and pausing the run mode loop execution. Once the ISR 190 has received the byte and added it to the end of the matrix buffer 178, the microcontroller 80 may resume normal program execution. In this manner, data may be added to the end of the circular matrix buffer 178.

When the microcontroller 80 subsequently detects a new byte in the matrix buffer 178, it may transfer a previously stored input function, such as a single key data or macro data, to the send buffer 180. This input function may be fetched from the memory 88 and may be determined by both an active matrix data set 174 and the pad 106 identified by this newly added byte. After handling the matrix buffer 178, the microcontroller 80 may perform a similar operation for the keyboard buffer 172. However, unlike the conversion process applied to the data in the matrix buffer 178, data in the keyboard buffer 172 may be relayed directly to the send buffer 180.

The microcontroller 80 may next examine the contents of the send buffer 180. Then, the microcontroller may transfer newly added data from the matrix buffer 178 and/or the keyboard buffer 172 to the host computer 70. Finally, the microcontroller 80 may check for a button press or a mode change before starting the loop again.

Using the interrupt service routines 190 and the three circular buffers as described allows for the simultaneous use of the standard keyboard 72 with the present invention. For some known keyboard wedge devices, pressing and holding down a key on the standard keyboard 72 blocks data from being sent by the secondary device until the standard keyboard stopped transmitting data, that is, until the key is released. By applying interrupts and circular buffers, data traffic from both the standard keyboard 72 and the matrix scanner 78 may be detected, captured, multiplexed, and forwarded to the host computer 70 effectively.

Figure 18:
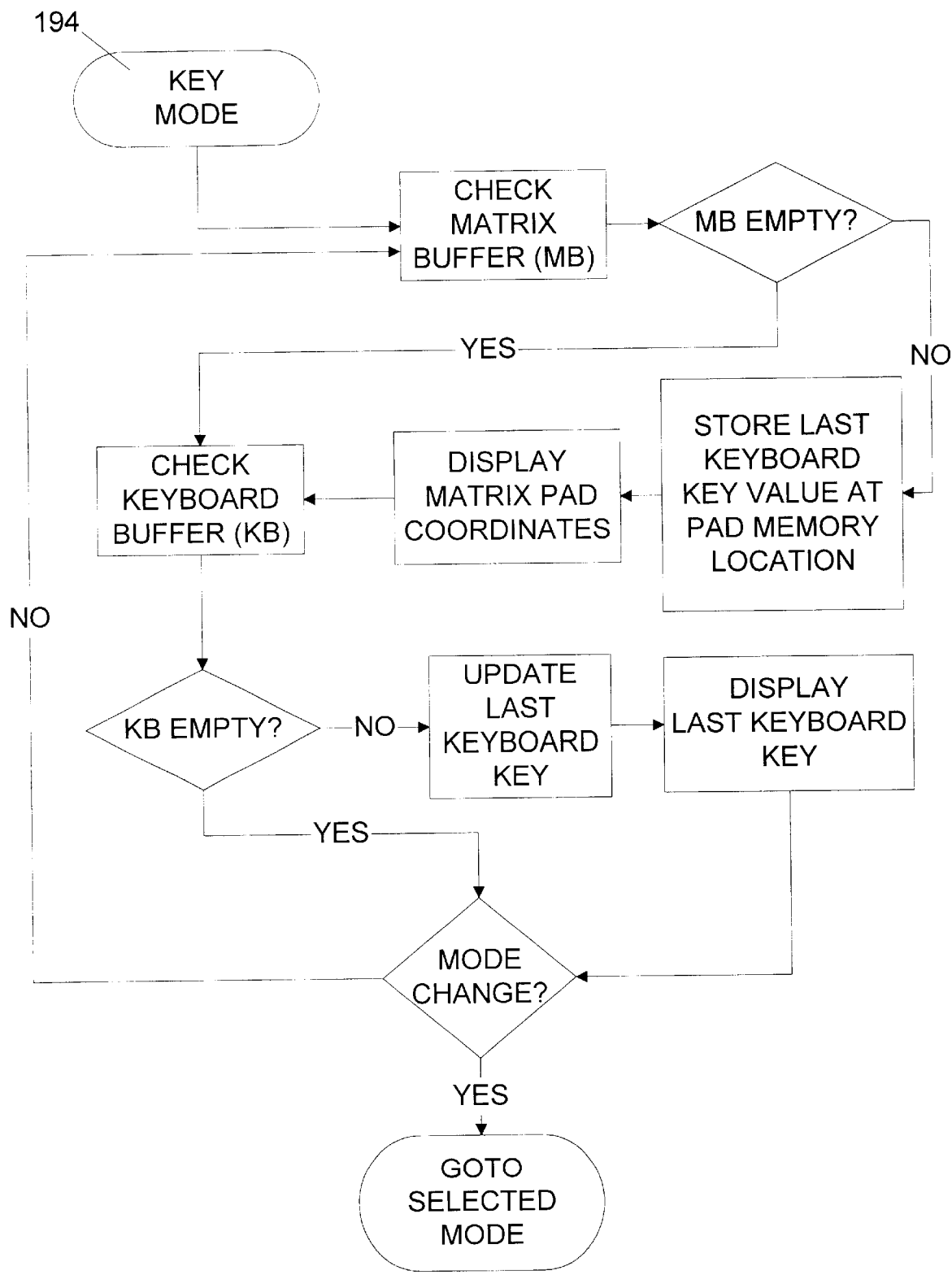
FIG. 18 represents a flowchart outlining an embodiment of a program key mode routine according to the present invention.

The flow diagram shown in FIG. 18 illustrates the operation of the microcontroller 80 during the key mode 194. The key mode 194 is a programming mode for the device, allowing the user to program the key switch modules 46 inserted into the matrix 42 to operate like standard keyboard keys. For example, during the key mode 194, a user may program a key switch module 46 as the "Q" key of the standard keyboard 72.

After returning to the run mode 192, the programmed key switch module 46 mimics the electronic behavior of a standard "Q" key. Depressing the key switch module 46 generates a "Q-key make-code" to be sent to the host computer 70. After a brief delay, holding the key switch module 46 down causes the "make code" to be sent repeatedly, duplicating the key repeat feature of the standard keyboard 72. When the key switch module 46 is released, a "Q-key break code" is sent to the host computer 70. The host computer 70 does not detect that the transmitted key input function is not generated by a standard keyboard 72.

The key mode 194 operation shares many similarities to the run mode 192 operation. However, a major difference is that no data typically is transmitted to the send buffer 180, or the host computer 70, during the key mode 194. As shown in the flowchart illustrated in FIG. 18, during the key mode loop, the microcontroller 80 may monitor the data traffic sent by the standard keyboard 72 and retains the value of the last key transmitted. Once a key switch module 46 is pressed, indicated by a new data appearing in the matrix buffer 178, the value of the last key transmitted by the standard keyboard 72 may be stored in the current matrix data set 174 memory location for the pad 106 in which the key switch module 46 is placed. The value of the last key transmitted and the assigned pad location may be displayed by display 48.

Figure 19:
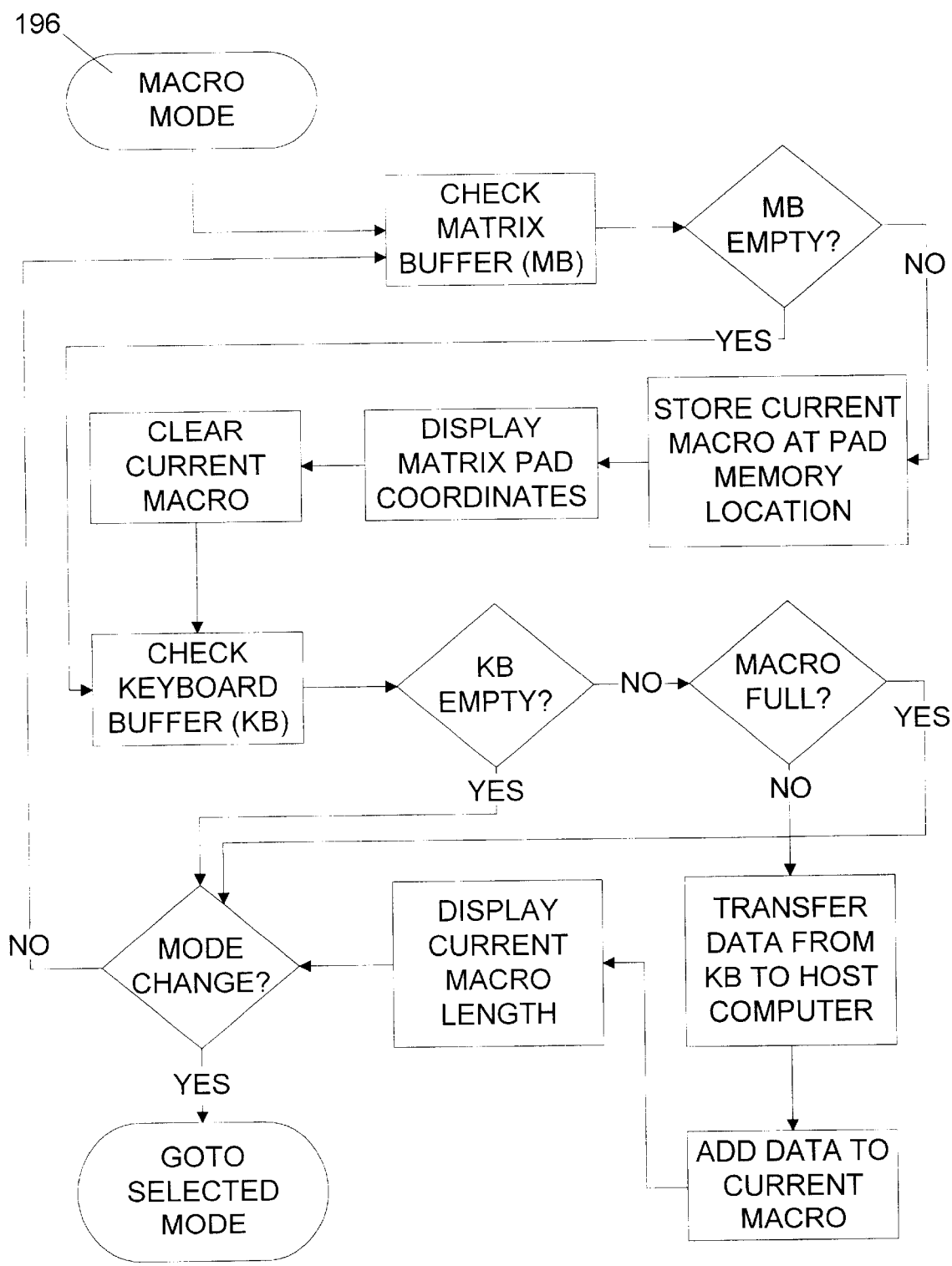
FIG. 19 represents a flowchart outlining an embodiment of a program macro mode routine according to the present invention.

The flow diagram shown in FIG. 19 illustrates an embodiment of the operation of the microcontroller 80 during the macro mode 196. Like the key mode 194, the macro mode 196 is a programming mode for the device. However, the macro mode 196 allows the user to assign key macros to a key switch module 46. A macro can include a sequence of multiple key presses and/or other inputs from other computer input devices, such as a mouse, joystick, trackball, game controller or other input device. A difference between a key assignment and a macro assignment is that after returning to the run mode 192, a key switch module 46 may be programmed with a macro that mimics multiple sequential key presses of a standard keyboard 72 or other input of any other input device.

According to one example, instead of a single key, a macro can include a string of keys, such as "dog". A macro can also initiate common control key sequences, such as the "Ctrl" +"S" key combination. Any other string of inputs may also be included in a macro. Such macros may find use in many common computer applications.

In each of the four matrix data sets 174, each pad 106 in the matrix 42 may have memory allocated for macro sequences up to 126 bytes long. During the run mode 192, a key switch module 46 programmed with a macro transmits the entire stored key sequence when pressed. Typically, nothing is transmitted when the key switch module 46 is released.

As shown in the flow chart illustrated in FIG. 19, during the macro mode 196, the microcontroller 80 may monitor and store data traffic from a standard keyboard 72 through the keyboard buffer 176. The microcontroller 80 may continue to add the keyboard traffic to the recorded macro until either a key switch module 46 is pressed or the macro becomes too large. Once a key switch module 46 is pressed, which may be indicated by a new data appearing in the matrix buffer, the value of the recorded macro may be stored in the current matrix data set 174 memory location for the pad 106 in which the key switch module 46 is placed. To make it easier for the user to monitor the macro as it is recorded, data traffic from the standard keyboard 72 may be transmitted to the host computer 70 during the macro mode 196.

To operate a device according to the present invention, the device may be connected to a host computer 70 and a standard keyboard 72, as shown in FIG. 3. This description particularly applies to the embodiment shown in FIGS. 1 and 2. The user may then arrange one or more key switch modules 46 into a desired layout on the matrix 42, as shown in FIG. 1.

Figure 20A:
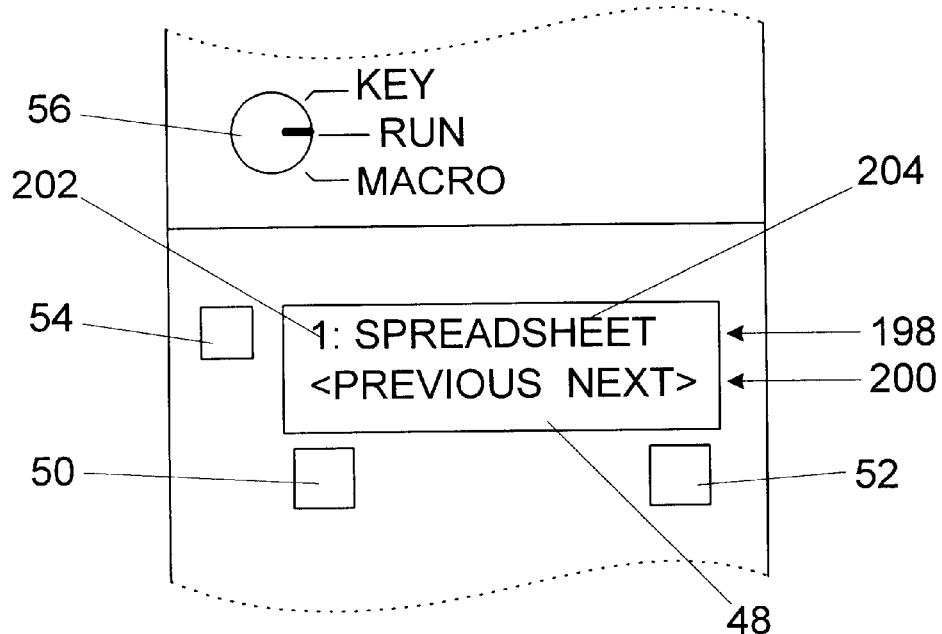
FIG. 20A represents a close-up top view a portion of an input device according to the present invention, illustrating an embodiment of a display, three control buttons, and a mode selection switch as they could appear during a run mode according to the present invention.

Assuming that the user has programmed the desired input functions for the pads 106 into which the key switch modules 46 are inserted, the device may be set to the run mode 192 with the mode switch 56 pointing to "Run" as shown in FIG. 20A. During the run mode 192, a first display line 198 of display 48 may include a matrix data set number, or set number 202 and a matrix data set label, or set label 204. The set number 202 may communicate the currently selected matrix data set 174, numbered one to four. The set label 204 may be a user defined string that identifies the name of the current matrix data set 174. To change the current set label 204, a user may press the label button 54, type a new set label 204 using the standard keyboard 72 letter and number keys, and then accept the change by pressing the "Enter" key on the standard keyboard 72.

During the run mode 192, the user also may change to the next or previous matrix data sets 174 using the left button 50 and the right button 52. The ability to change the data set 174 allows the user to assign, store, and use separate input functions for separate applications and key switch module 46 layouts.

Additionally during the run mode, standard keyboard 72 data traffic may be relayed through the device to the host computer 70. The user may use the standard keyboard 72 in a normal manner. The user may also use the programmed key switch modules 46 for computer input functions.

Pressing a key switch module 46 will send the programmed function, whether a single key or action or macro of a plurality of actions, of the corresponding pad 106 location to the host computer 70. Pressing a key switch module 46 that has not been programmed for the current matrix data set 174 will not have any effect. In other words, no data will be transmitted to the host computer 70. The present invention permits a user to add the benefit of a programmable, dynamic computer input device while keeping the familiar standard keyboard 72.

For the currently selected matrix data set 174, the user may overwrite an existing input function assignment or create a new assignment if none already exists using either the key mode 194 or the macro mode 196. As described earlier, the key mode 194 can assign the function of a single key to the pad 106 of a key switch module 46. The macro mode 196 may assign key macros to the pad 106 of a key switch module 46.

Figure 20B:
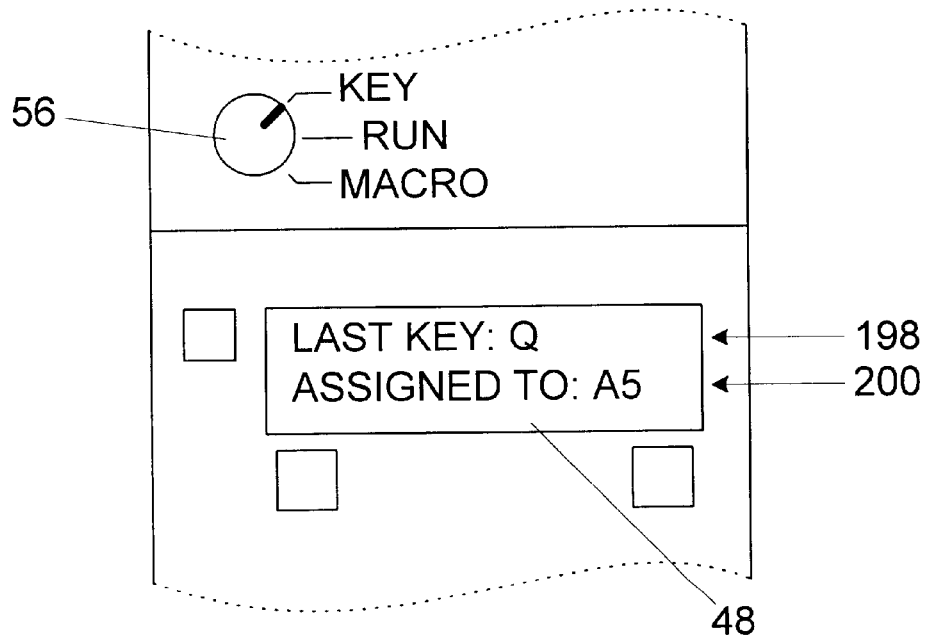
FIG. 20B represents a close-up top view of the portion of an input device shown in FIG. 20A, illustrating an embodiment of a display, three control buttons, and a mode selection switch as they could appear during a key mode according to the present invention.

The device may be set to the key mode 194 by turning the mode switch 56 to "Key" as shown in FIG. 20B. During the key mode 194, the display 48 may change the display to indicate the current programming status of the device. The first display line 198 may show the last key, if any, the user pressed on the standard keyboard 72. The second display line 200 may show the position of the pad 106 that was assigned with the last key detected from the standard keyboard 72.

The pad 106 positions may be identified with an alphanumeric grid. In other words, columns in the matrix 42 may be labeled A through J, while rows may be labeled one through eight. To assign a key function, the user typically first ensures that a key switch module 46 is placed within the desired pad 106. Next, the key to be assigned is pressed on the standard keyboard 72 or other input device. Then, the key switch module 46 may be pressed to bind the detected key function to the corresponding pad 106.

According to one example, a user desires to assign the pressing the "Q" key on a keyboard as the function to a key switch module 46 inserted in the pad 106 located at position A5. First, the user may set the device to the key mode 194 with the mode switch 56. Next, the user may insert a key switch module 46 into the desired pad 106. Then, the user may press the "Q" key on the standard keyboard 72. This key press may be detected by the device and may be indicated on the first display line 198. Next, the user may press the key switch module 46, causing the key function to be bound to the corresponding pad 106. The location of the assigned pad 106 may be indicated on the second display line 200. This process can be repeated until all the desired key switch modules 46 are programmed.

Figure 20C:
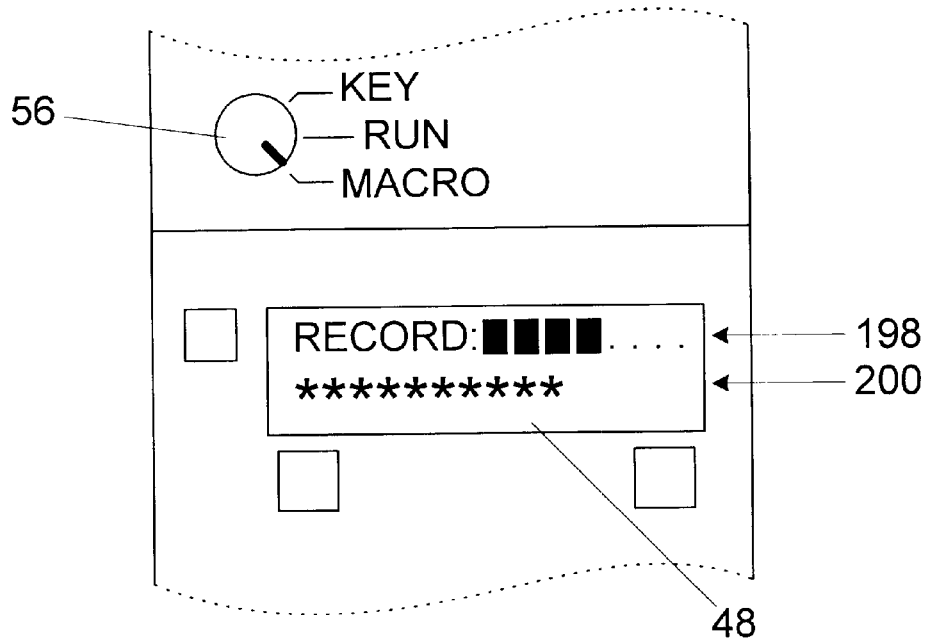
FIG. 20D represents a close-up top view of the portion of an input device shown in FIG. 20A, illustrating an embodiment of a display, three control buttons, and a mode selection switch as they could appear during a clear label mode according to the present invention.

The device may be set to the macro mode 196 by turning the mode switch 56 to "Macro" as shown in FIG. 20C. The macro mode 196 is similar to the key mode 194, except that instead of storing just the last key pressed on the standard keyboard 72 and/or other input from any other computer input device, a sequence of one or more key presses or other inputs may be recorded and assigned to a single pad 106 on the matrix 42.

During the macro mode 196, display 48 may change the display to indicate the current programming status of the device. The first display line 198 and the second display line 200 can show the current number of data bytes recorded for the current macro. To record a macro with the current embodiment, the user may type keys in a desired sequence on the standard keyboard 72. The input device of the present invention can record these key sequences in the macro buffer 170, one embodiment of which is shown in FIG. 14, until the macro reaches maximum length. After reaching the maximum length, the device ceases to record any further additions. The maximum length may vary, depending upon the embodiment.

Once the macro has been recorded, the user may then press the desired key switch module 46 to assign the macro to a corresponding pad 106. The second display line 200 may then change to indicate the position of the pad 106 assigned with the macro. Once the macro has been assigned, the user may continue to record other macros or may return the device to the run mode 192.

Figure 20D:
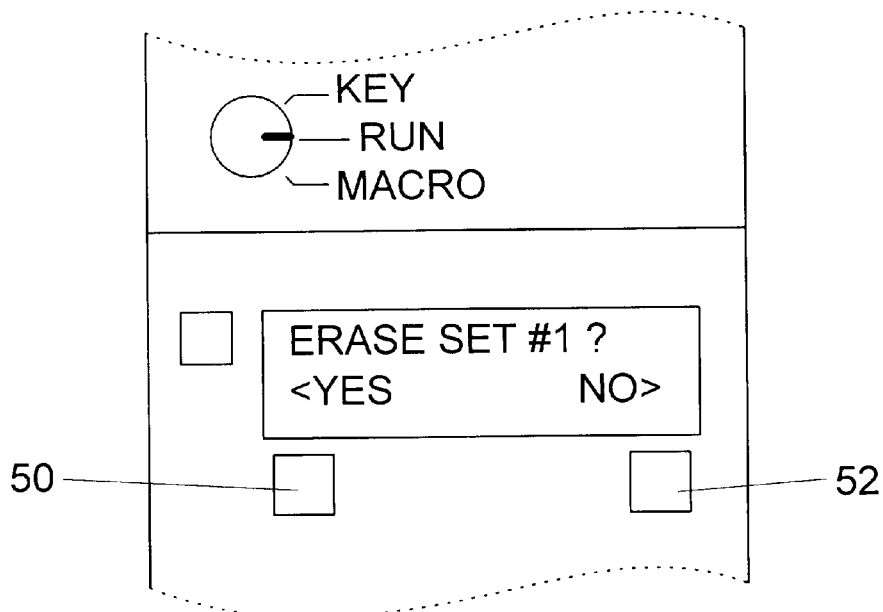

During the run mode 192, a selected matrix data set 174 may be erased using the clear button 68. After pressing the clear button 68, the display 48 may display a confirmation message to prevent accidental erasure, as shown in FIG. 20D. Selecting "No", the right button 52 in the illustrated embodiment may skip the erase command and return to the run mode 192. Selecting "Yes", the left button 50 in the illustrated embodiment, can confirm the erase command and clears any input functions, whether single function or macro of functions, assigned to the pads 106 for the selected matrix data set 174. The matrix data set label 204 may be changed to read "Empty". The device may then return to the run mode 192. Erasing a matrix data set 174 can permit the user to reprogram the device easily and effectively as the need arises.

Figure 22:
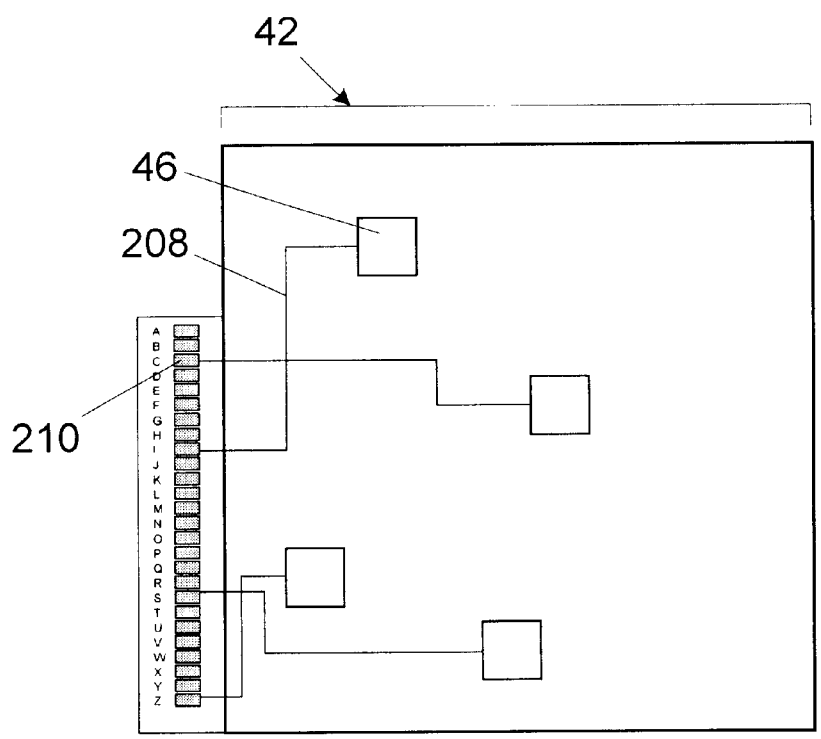
FIG. 22 represents a top view of another embodiment of the present invention that includes a matrix of receptacles including input function posts and external connection wires.

Many alternate methods also exist for identifying or programming the key switch modules 46 that may also be applied to the present invention. For example, the key switch modules 46 may be attached to external connection wires 208 as shown in FIG. 22. To program the key switch module, the external connection wire 208 may be removably attached to an input function post 210 that represents a specific key or macro. According to this embodiment, the matrix 42 itself does not need to be scanned. Rather, the matrix may be used as a mechanical platform to hold the key switch modules 46. Only the input function posts need to be monitored to detect activity from the key switch module 46.

Other potential matrix-switch design combinations include producing key switch modules 46 that contain individual network identifiers that are transmitted to a common matrix bus. This can allow the key switch module 46 to identify itself instead of relying on its position within the matrix 42. This design can eliminate the traditional matrix scanner by substituting an electrical bus mastering and monitoring circuit.

According to another embodiment, lookup tables 160 and the matrix data sets 174 are moved to the host computer 70. In this embodiment, the host computer 70 assumes the task of assigning the programmable functions of individual matrix positions after receiving static functions from the device in response to switch activation. Using a host computer to re-assign functions to specific keys of the standard keyboard is well known in the art. Although this embodiment may require a modification to the host computer 70, such as changing the key map configuration, it may result in a less complicated design of the hardware and software of the present invention.

The host computer 70 may also provide a means to assign, store, and transfer key map configurations for the present invention. While the present invention may include a means for programming the device using the standard keyboard 72, this programming method may be augmented or replaced with software running on the host computer that allows users to select a function for a particular key position. That information could then be transferred to a device according to the present invention. The transfer could be accomplished by any means, such as by using a serial, parallel, USB, IR, or other connection.

Figure 25:
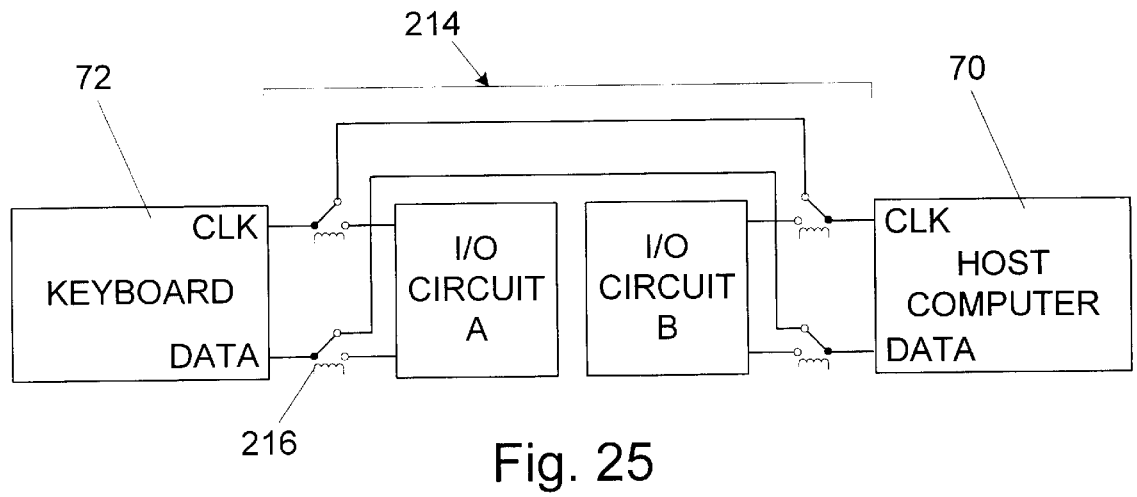
FIG. 25 represents a schematic drawing of an embodiment of a device bypass circuit that permits keyboard traffic to pass to a host computer when an input device according to the present invention has power turned off or is not connected to a power supply.

The present invention may include a bypass circuit to permit a standard keyboard 72 or other input device to remain connected and operational when the present invention is not powered. FIG. 25 illustrates one possible embodiment of a bypass circuit 214 that may be utilized with the present invention. Of course, if the present invention is not connected between a keyboard and a host computer, then such a circuit may not be necessary.

Without a bypass circuit, keyboard traffic, for example, may not be relayed to a host computer 70 when the device according to the present invention is turned off. The embodiment of the bypass circuit 214 shown in FIG. 25 includes four reed relays 216 to connect the standard keyboard 72 directly to the host computer 70 automatically when power is removed from the device. When the power is switched on, the reed relays 216 reconnect the standard keyboard 72 and the host computer 70 to the appropriate I/O circuits as described in the basic embodiment.

Figure 27:
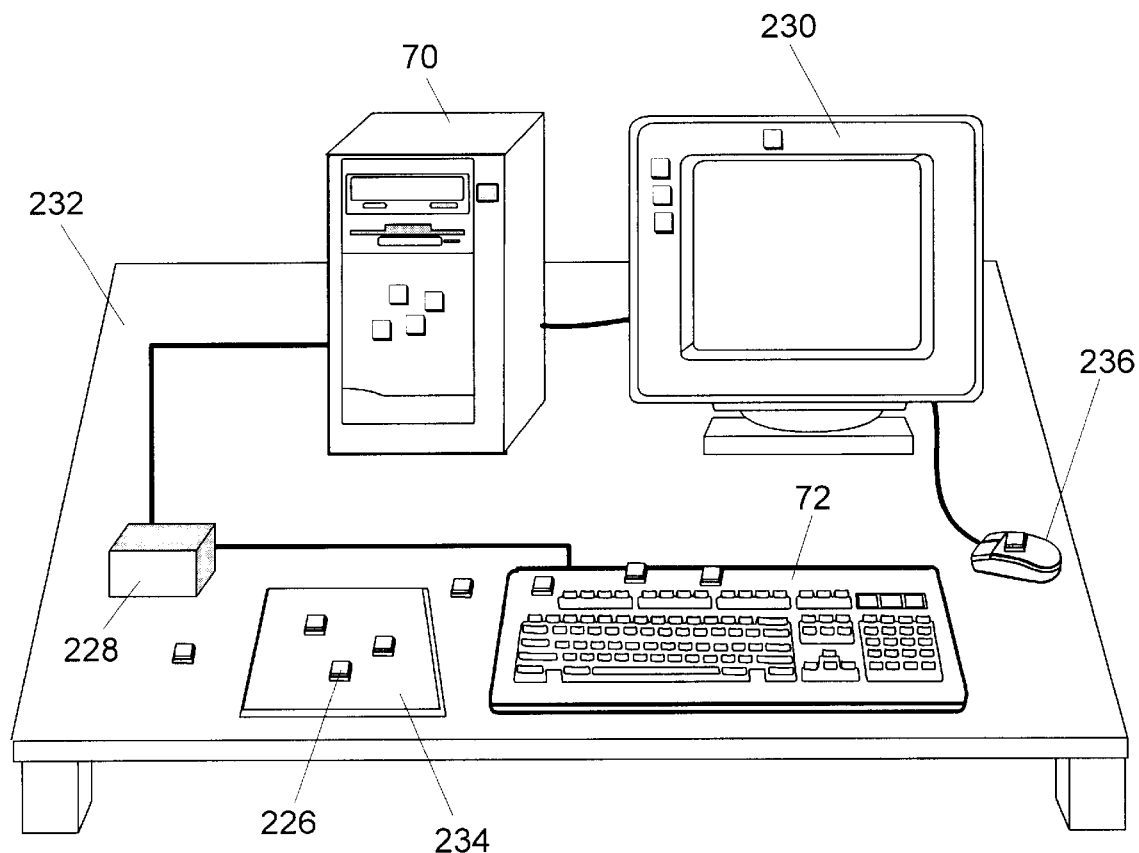
FIG. 27 represents a perspective view of an embodiment of a system according to the present invention that includes wireless communication between elements of the system.

FIG. 27 illustrates an embodiment of a system according to the present invention that includes wireless communication between elements of the system. Along these lines, FIG. 27 illustrates a plurality of switches 226 that utilize wireless communication techniques, such as radio frequency and/or infrared transmission to indicate their activation status to a receiving unit 228. Any wireless communication protocol may be utilized.

An attachable backing included on the wireless switches 226 can permit a user to removably or permanently attach individual switches to a variety of useful locations. Any attachable backing could be utilized. Along these lines, one or more adhesives, suction, or magnets may be utilized. Surfaces that the at least one switch could be attached to include a monitor 230; case of a computer, including host computer 70; a desk or other work surface 232; a computer keyboard, including the standard keyboard 72; a switch tray or platform 234; a chair (not shown); a computer mouse 236; and a printer (not shown). Any other surface may also be utilized.

In view of the disclosure contained herein, the present comfortable computer input device for many common applications. In addition to the dynamic positioning of individual keys, the invention can rely on standard interface protocols, thereby eliminating the needs for special software drivers to be installed on the host computer. Furthermore, the device can operate in conjunction with standard input devices, such that a user may continue to use these standard devices in a normal manner.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

I claim:

1. A configurable computer input device, comprising:
   at least one switch removably attachable to a surface and in communication with a processor, at least one function being assignable to activation of the switch, wherein the surface that the at least one switch is attached to comprises at least one matrix of receptacles that the at least one switch is removably attachable to at a plurality of positions, wherein the at least one switch is repositionable at distances smaller than a length or width of the at least one switch;
   circuitry in communication with the at least one switch for assigning at least one function to activation of the switch;
   circuitry for communicating the at least one function to a host computer;
   circuitry for determining the actuation status of the at least one switch and communicating the actuation status to the processor; and
   a memory for storing data comprising a mapping of the at least one function assigned to the at least one switch to the position of the at least one switch in the at least one matrix of receptacles.

2. The device according to claim 1, wherein the at least one switch comprises at least one pin that extends from the switch and is receivable by the matrix of receptacles.

3. The device according to claim 1, wherein the at least one matrix of receptacles is housed in a keyboard housing with a standard keyboard.

4. The device according to claim 1, wherein the at least one matrix of receptacles is housed in a videogame controller.

5. The device according to claim 1, wherein the matrix of receptacles is non-contiguous.

6. The device according to claim 1, wherein the matrix of receptacles is non-planar.

7. A configurable computer input device, comprising:
   at least one switch removably attachable to a receiving surface;
   at least one receiving surface for receiving the at least one switch at a plurality of positions, wherein the at least one receiving surface comprises a matrix of receptacles for receiving pins attached and electrically connected to the at least one switch, wherein a distance separating any two positions may be smaller than a length or a width of the at least one switch;
   a memory for storing data comprising a mapping of at least one electronic, alphanumeric, or keyboard function to the at least one switch when the at least one switch is removably attached to a position of the receiving surface;
   circuitry for scanning the at least one switch when the at least one switch is removably attached to a position of the receiving surface and for determining the actuation status of the at least one switch;
   a controller responsive to the circuitry for scanning and for consulting the memory to obtain the at least one function mapped to the at least one switch upon actuation of the at least one switch; and
   circuitry for transferring the at least one function obtained by the controller to a host computer with which the device communicates.

8. A computer system, comprising:
   a configurable computer input device, comprising at least one switch removably attachable to a surface and in communication with a processor, the surface comprising at least one matrix of receptacles that the at least one switch is removably attachable to at a plurality of positions, the at least one switch may be repositioned on the matrix of receptacles at distances smaller than a length or width of the at least one switch, at least one function comprising at least one electronic, alphanumeric or keyboard function is assignable to activation of the switch;
   circuitry in communication with the at least one switch for assigning at least one function to activation of the switch;
   circuitry for communicating the at least one function to a host computer; a memory storing data comprising a mapping of the at least one function assigned to the at least one switch to the position of the at least one switch in the at least one matrix of receptacles; and circuitry for determining the actuation status of the at least one switch and communicating the actuation status to the processor; and
   a host computer selected from the group consisting of a microcomputer and video game computer.

* * * * *